United States Patent [19]
Shimizu et al.

[11] Patent Number: 6,004,926
[45] Date of Patent: Dec. 21, 1999

[54] BODY FAT PERCENT-LOWERING, BODY COMPOSITION-IMPROVING FOOD COMPOSITION AND A METHOD FOR LOWERING THE BODY FAT PERCENTAGE AND IMPROVING THE BODY COMPOSITION

[75] Inventors: Seiichi Shimizu, Tosu; Yasuyuki Yoshioka, Kurume; Koji Okamura, Kasuga; Tatsuya Doi, Kanzaki-gun, all of Japan

[73] Assignee: Otsuka Pharmaceutical Co., Ltd., Tokyo, Japan

[21] Appl. No.: 09/000,221

[22] PCT Filed: May 19, 1997

[86] PCT No.: PCT/JP97/01680

§ 371 Date: Jan. 23, 1998

§ 102(e) Date: Jan. 23, 1998

[87] PCT Pub. No.: WO97/43912

PCT Pub. Date: Nov. 27, 1997

[30] Foreign Application Priority Data

May 23, 1996 [JP] Japan ..................................... 8-128494

[51] Int. Cl.⁶ ..................................................... A61K 38/00
[52] U.S. Cl. .................................... 514/2; 514/2; 514/23; 514/789; 514/801; 424/576; 424/601; 424/648
[58] Field of Search ..................................... 426/576, 601, 426/648; 514/2, 23, 789, 801

[56] References Cited

U.S. PATENT DOCUMENTS 4,499,076  2/1985  Ohashi et al. .
5,080,921  1/1992  Reimer .

FOREIGN PATENT DOCUMENTS 2189160    7/1986   European Pat. Off. .
1511587    11/1992  European Pat. Off. .
9100238    4/1997   Japan .
WO9115127  10/1991  WIPO .

OTHER PUBLICATIONS

FSTA 97 (09):A 0125, Surwit et al, 1997.
CA 125:166491, Stubbs et al, 1996.
Embase 95094529, Hackman et al, 1995.
JICST–EPIUS 930145035, Chu, 1992.
WPIDS 77–57672Y, Aust, Jun. 22, 1977.

*Primary Examiner*—Rebecca Cook
*Attorney, Agent, or Firm*—Sughrue, Mion, Zinn, Macpeak & Seas, PLLC

[57] ABSTRACT

A body fat percentage-lowering, body composition-improving food composition comprising 10–65 weight % of protein, 5–25 weight % of fat, and 15–70 weight % of carbohydrate, all on a dry weight basis, which composition is to be taken before, during, and/or after exercise, particularly after exercise preceding a resting period, and a method for lowering body fat percentage and improving body composition through utilization of the above food composition.

2 Claims, 21 Drawing Sheets

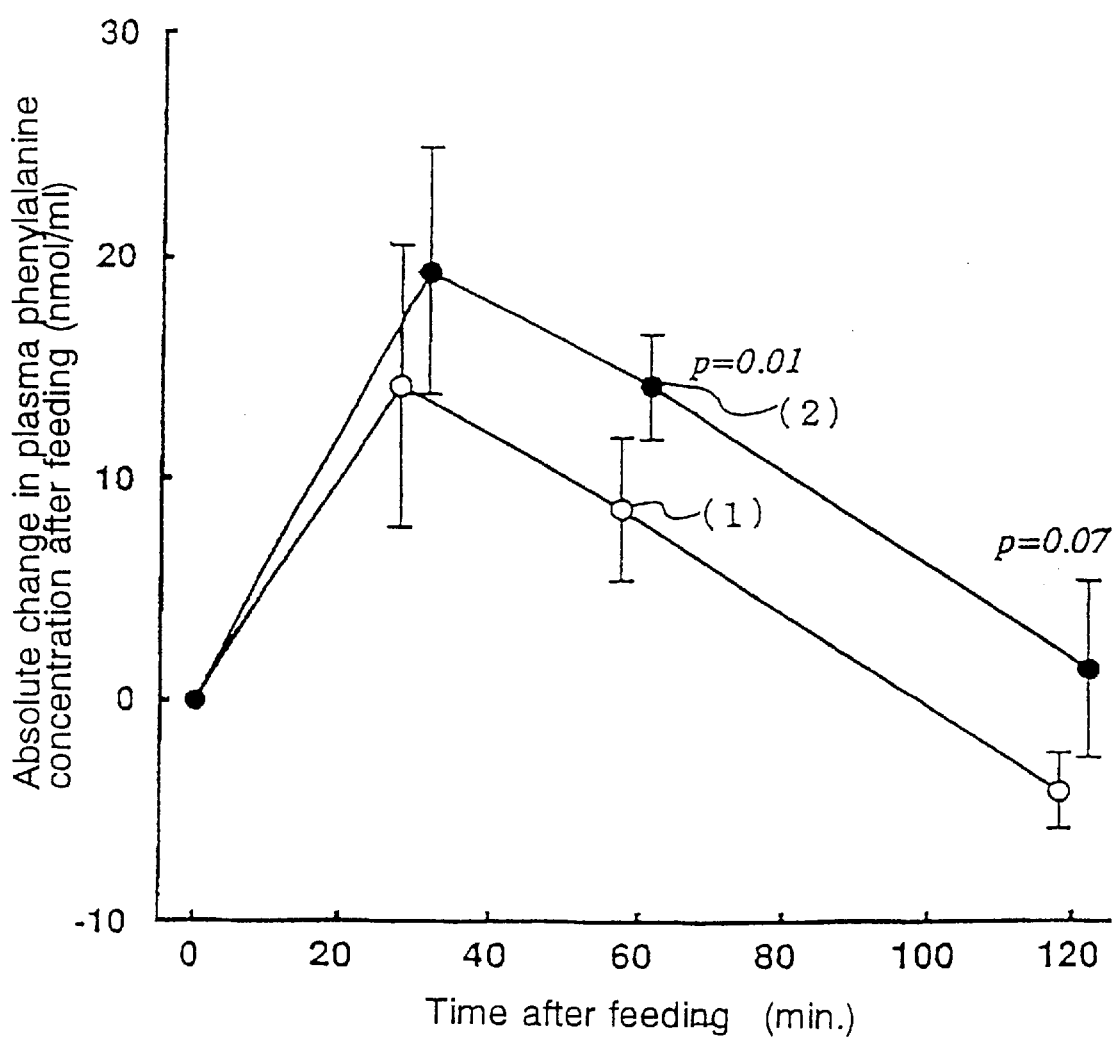
F I G. 4

BODY FAT PERCENT-LOWERING, BODY COMPOSITION-IMPROVING FOOD COMPOSITION AND A METHOD FOR LOWERING THE BODY FAT PERCENTAGE AND IMPROVING THE BODY COMPOSITION

This is a 371 of PCT/JP97/01680 filed May 19, 1997.

TECHNICAL FIELD

The present invention relates to a body fat percentage-lowering, body composition-improving food composition and a method for lowering the body fat percentage and improving the body composition.

BACKGROUND ART

With the increasing consciousness of health and greater importance attached to shape-up, dieting, and so on in recent years, the sporting population devoted to jogging, cycling, mountain climbing, and so on is on the steady increase and a variety of food compositions designed to supply energy in such physical exercises and permit an easy and convenient intake of high-quality protein for increased muscle mass and shape-up are being explored and developed.

The inventors of the present invention also did much research for the purpose of providing a food composition adapted to supply nutrients on the occasion of such sport activities and previously succeeded in developing a high-protein, high-viscosity nutritional food composition suited for the purpose (Japanese Examined Patent Publication No. 102112/1995). This composition is not only useful for feeding in sport activities but also can be taken easily and conveniently even by hospitalized patients on the bed during the postoperative period of convalescence or in the recovery stage of liver and kidney diseases, for instance, but it is not sufficiently effective in lowering the human body fat mass or improving the chemical composition of the body.

The object of the present invention, therefore, is to provide a novel food composition capable of lowering the body fat percentage and improving the body composition and a methodology for judicious ingestion of the food composition.

With the above object in mind, the inventors of the present invention did further research and discovered surprisingly that ingestion of a defined food, such as the above food composition, according to a predetermined time schedule associated with physical exercises can increase muscle mass and decrease fat mass leading to an improvement in body composition. The present invention has been developed on the basis of the above finding.

DISCLOSURE OF INVENTION

The present invention thus provides a method for lowering the body fat percentage and improving the body composition, which comprises ingesting a food composition containing 10–65% (weight %; the same applies hereinafter) of protein, 5–25% of fat, and 15–70% of carbohydrate, all on a dry weight basis, before, during, and/or after a bout of exercise, preferably after the exercise immediately preceding a resting period, and a body fat percentage-lowering, body composition-improving food composition for use in the method.

As a particularly preferred food composition according to the present invention, there can be mentioned a composition which, on a dry weight basis, comprises 40–65% (weight %; the same applies hereinafter) of protein, 5–25% of fat, and 15–40% of carbohydrate and has a viscosity (30° C., type-B viscometer) within the range of 500 to 3000 cps and an amino acid score (based on a 2–5-year-old human) of not less than 80.

The term "amino acid score (based on a 2–5-year-old human)" is used herein to mean the score calculated according to the following amino acid scoring pattern (preschool 2–5 years of age) established by the 1985 FAO/WHO/UNU Joint Committee.

| Amino acid abbreviation | Essential amino acid per unit protein (mg/g protein) |
|---|---|
| His | 19 |
| Ile | 28 |
| Leu | 66 |
| Lys | 58 |
| Cys | 25 |
| Tyr | 63 |
| Thr | 34 |
| Trp | 11 |
| Val | 35 |
| Total (inclusive of His) | 339 |
| (exclusive of His) | 320 |

Protein mass is calculated as "nitrogen × 6.25".

The composition of the present invention contains not only protein of per se high quality in a high concentration but also the fat and carbohydrate necessary for nutrition in a good balance and when it is ingested before, during, and/or after exercise, particularly after the exercise immediately preceding a resting period, the protein is selectively taken up in the muscle tissue in the state where the process of protein assimilation is invigorated by the exercise, while the fat is combusted as an energy source and consumed, with the resulting improvement in body composition contributing neatly to shape-up, body building, muscle increase, and augmentation of the dynamic strength of muscles.

The nutritional food composition of the present invention is now described in detail. This composition can be produced by incorporating the above-mentioned specific protein, fat and carbohydrate as essential components in otherwise the similar manner as the conventional nutritional foods of the kind.

The above-mentioned protein includes, but is not limited, to casein and its salts, gelatin and its salts, soluble gelatin (e.g. enzymatically digested gelatin) whole fat milk powder, nonfat milk powder, soybean protein, corn gluten meal, and wheat flour. The fat includes, but is not limited, to soybean oil, olive oil, medium-chain triglycerides (MCT), cottonseed oil, sunflower oil, cacao butter, sesame oil, rice oil, safflower oil, peanut oil, palm oil, and rapeseed oil.

The carbohydrate includes, but is not limited, to dextrin, cane sugar, monosaccharides such as fructose and glucose, disaccharides such as malt sugar, maltose, etc. and oligosaccharides such as fructooligosaccharide, lactooligosaccharide, galactosyllactose, and lactosucrose.

The formulating proportions of the above components for the composition of the present invention can be respectively selected from the following ranges.

| Component | Permissible percent (wt. %) | Preferred percent (wt. %) | Optimal percent (wt. %) |
|---|---|---|---|
| Protein | 10–65 | 40–65 | 40–53 |
| Fat | 5–25 | 5–25 | 10–18 |
| Carbohydrate | 15–70 | 15–40 | 20–35 |

The above amount of protein is expressed in terms of pure proteins based on the nitrogen content of the source materials as determined by the Kjeldahr method.

In addition, the composition of the present invention can be supplemented, where necessary, with the various additives well known for use in nutritional food products of the kind. Such additives include various vitamins, minerals, spices inclusive of synthetic and natural spices, natural sweeteners (thaumatin, stevia, etc.), synthetic sweeteners (saccharin, stevia extract, aspartame, etc.), coloring matter, flavors (cheese, chocolate, etc.), and even the so-called dietary fibers such as polydextrose, pectin acid and its salts, arginic acids and its salts, and so on. Those additives can be used independently or in a combination of two or more kinds. There is no particular limit to the formulating amount of such additives but usually they are added in a proportion of 0 to about 20 parts by weight for each 100 parts by weight of the composition of the invention.

The composition of the present invention is prepared by mixing the above components. Although there is no particular limitation on the production technology that can be used, a typical method comprises adding as necessary the conventional emulsifier, e.g. lecithin, sugar ester, etc., and auxiliary emulsifier, e.g. protein, carbohydrate, etc., to an oil-soluble component (an oil, fat, or other oil-soluble material) and emulsifying the mixture mechanically in the per se known manner. By such a procedure there can be provided a composition according to the present invention.

The composition of the invention as produced in the above manner can be filled in a suitable container and retort-sterilized (120° C., 20 minutes) to provide a final product with a good shelf-life. This product can be used directly or after appropriate dilution.

The composition of the invention, thus provided, insures decomposition (digestion) and absorption at suitable rates in the intestinal tract, is of low osmotic pressure, thus circumventing the risk of diarrhea almost completely in the human who has ingested it, and therefore contributes to an improved nutritional status expected from food of this type. In addition, when taken at a pertinent timing in accordance with the invention, the composition expresses its expected effects fully in regard to lowering the body fat percentage and improving the chemical composition of the body.

The dose of the composition can be chosen according to the age, body weight, and gender of the individual to take the composition, the purpose of use, and other factors and does not obey any hard- and-fast rule. Usually, however, the dosage is preferably selected from the range of about 10–30 g/dose on a dry weight basis or about 50–300 cc as the total volume.

It is an important aspect of the present invention to have the above-defined composition taken before, during, and/or after a bout of exercise, particularly after the exercise immediately preceding a resting period. The term "before a resting period" means the evening hours till bedtime and the term "exercise" means the exertion of muscular forces in the usual sense, regardless of whether it occurs in a gymnastic practice, a walk, jogging, cycling, golfing, tennis, swimming, marathon, or triathlon, for instance. The term "after exercise" means the time period immediately following a bout of exercise through one hour later, preferably just after exercise, and, where the exercise includes intervals, means the time after completion of the whole session. Furthermore, in case the exercise is a long-lasting one, e.g. a marathon or a triathlon, the composition of the invention is preferably taken during the exercise.

By causing the above food composition to be taken according to the above-defined time schedule in accordance with the present invention, the desired objects of energy supply, muscle increase, body protein increase, shape-up, etc. can be accomplished. As an additional advantage, the intake of the composition is easy and expedient.

Ingestion of the body fat percentage-lowering, body composition-improving food composition of the invention in accordance with the above-defined schedule results in various improvements such as reduction of adipose mass and increase of muscle mass. Moreover, the composition of the present invention is advantageous in that its risk for diarrhea, vomiting, nausea, abdominal discomfort, and other adverse effects is extremely low.

BRIEF DESCRIPTION OF THE DRAWINGS

FIG. 4 is a graph showing the time course of plasma phenylalanine concentration after intake of the test composition in an experiment according to Test Example 3.

BEST MODE FOR CARRYING OUT THE INVENTION

Figure 1:
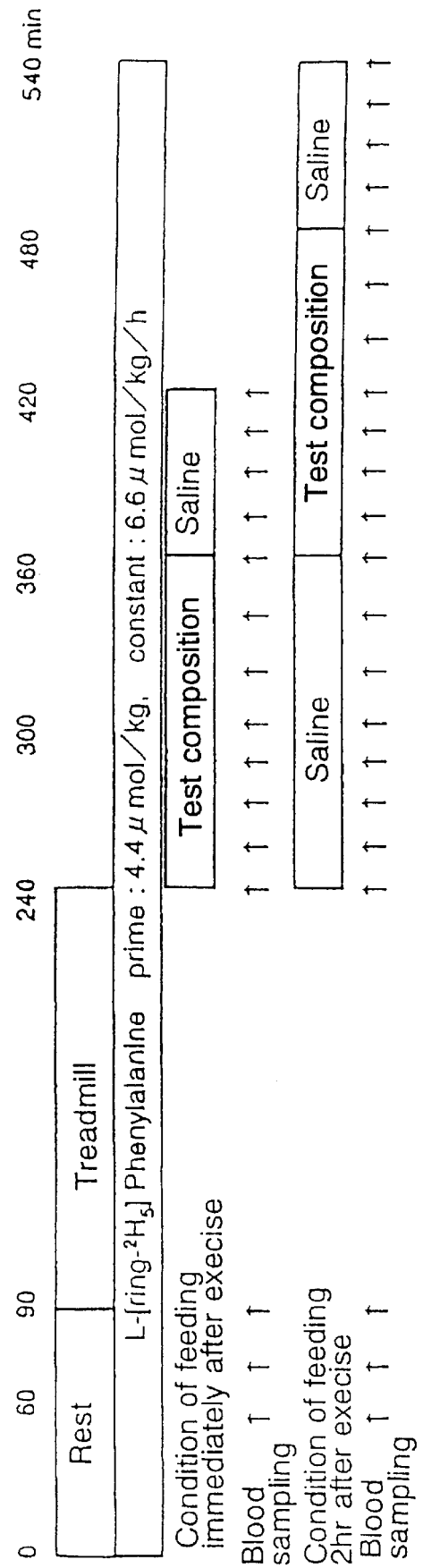
FIG. 1 shows the time schedule of an experiment according to Test Example 2.

For a more detailed description of the present invention, some examples of preparation of the preferred body fat percentage-lowering, body composition-improving food composition of the invention is shown below. Also shown are test examples for demonstrating the effect of the timing of intake of various compositions including the composition of the invention. In each example, % represents % by weight.

EXAMPLES 1–13

Casein sodium, casein calcium, gelatin, and sugar are put in water and dissolved therein with stirring. Then, NaCl and other minerals are added and dissolved with stirring to give Solution A.

On the other hand, casein is dissolved in water and neutralized with NaOH. To this solution are added $MgSO_4$ and other minerals, vitamins, and oils, and the mixture is stirred to give Solution B.

Solution A and Solution B are admixed and, after stirring and volume adjustment, vitamins, flavors, etc. are added. The mixture is emulsified to provide a food composition of the invention. This emulsion is dispensed in 80 ml aliquots into tubular containers and sterilized to provide final products.

Table 1 below shows the recipes (components and amounts), viscosities (30° C., type-B viscometer), and amino acid scores (based on 2–5 years of age) of the compositions of the invention as produced as above.

The vitamins and minerals used and their formulating amounts are shown below.

| Vitamins | | |
|---|---|---|
| Vitamin A | 1155 | IU |
| Vitamin $B_1$ | 0.92 | mg |
| Vitamin $B_2$ | 0.92 | mg |
| Vitamin $B_6$ | 0.92 | mg |
| Vitamin $B_{12}$ | 2.77 | μg |
| Vitamin C | 34.64 | mg |
| Vitamin D | 92.36 | IU |
| Vitamin E | 6.93 | IU |
| Pantothenic acid | 4.62 | mg |
| Niacin | 9.24 | mg |

-continued

| | | |
|---|---|---|
| Folic acid | 184.72 | μg |
| Biotin | 138.54 | μg |
| Vitamin K | 69.27 | μg |
| Choline | 115.45 | mg |
| Minerals | | |
| Ca | 230.90 | mg |
| $PO_4$ | 230.90 | mg |
| Mg | 92.36 | mg |
| Na | 323.26 | mg |
| K | 600.34 | mg |
| Cl | 461.80 | mg |
| Fe | 7.39 | mg |
| Zn | 3.69 | mg |
| Cu | 0.46 | mg |
| Mn | 9.24 | mg |
| I | 34.64 | μg |

TABLE 1

| Example No. | Example 1 | Example 2 | Example 3 | Example 4 | Example 5 |
|---|---|---|---|---|---|
| Protein | | | | | |
| (g/80 ml) | 9.5 | 10.2 | 13.0 | 12.2 | 10.8 |
| (w/w %) | 41.3 | 48.1 | 65.0 | 61.0 | 53.2 |
| Carbohydrate | | | | | |
| (g/80 ml) | 9.2 | 7.5 | 5.2 | 3.0 | 6.9 |
| (w/w %) | 40.0 | 35.4 | 26.0 | 15.0 | 41.7 |
| Fat | | | | | |
| (g/80 ml) | 4.3 | 3.5 | 1.8 | 5.0 | 2.8 |
| (w/w %) | 18.7 | 16.5 | 9.0 | 25.0 | 14.1 |
| Energy (Kcal) | 114 | 103 | 89 | 105 | 94 |
| Protein composition | | | | | |
| Casein | 5.0 | 4.9 | 6.9 | 6.7 | 5.6 |
| Casein Na | 2.1 | — | — | 2.2 | 1.1 |
| Casein Ca | 2.2 | 3.7 | 3.3 | 3.3 | 1.1 |
| Whole fat milk powder | — | 4.7 | 3.9 | — | 5.6 |
| Nonfat milk powder | — | 3.0 | 1.5 | — | 2.9 |
| Gelatin | 0.8 | — | — | 1.4 | 1.2 |
| Enzymatically hydrolyzed gelatin | — | — | 2.2 | — | — |
| Wheat flour | 3.0 | — | — | — | 2.0 |
| Cheese | — | 2.7 | 2.0 | — | — |
| Carbohydrate composition | | | | | |
| Purified sucrose | 7.0 | 2.4 | 2.7 | 3.0 | 1.7 |
| Fat composition | | | | | |
| Rice oil | 4.2 | 0.1 | — | 5.0 | 1.0 |
| Chocolate | — | 3.0 | — | — | — |
| Other components | | | | | |
| Vitamins | q.s | q.s | q.s | q.s | q.s |
| Minerals | q.s | q.s | q.s | q.s | q.s |
| Perfume | q.s | q.s | q.s | q.s | q.s |
| Viscosity (30° C.) cp | 1780 | 840 | 2220 | 1240 | 2150 |
| Amino acid score | 100 | 100 | 100 | 100 | 100 |

| Example No. | Example 6 | Example 7 | Example 8 | Example 9 | Example 10 |
|---|---|---|---|---|---|
| Protein | | | | | |
| (g/80 ml) | 9.0 | 12.0 | 8.8 | 10.0 | 9.6 |
| (w/w %) | 45.0 | 59.7 | 44.2 | 50.0 | 48.7 |
| Carbohydrate | | | | | |
| (g/80 ml) | 8.0 | 7.0 | 8.3 | 5.2 | 6.7 |
| (w/w %) | 40.0 | 34.8 | 41.7 | 26.0 | 34.0 |

TABLE 1-continued

| | | | | | |
|---|---|---|---|---|---|
| Fat | | | | | |
| (g/80 ml) | 3.0 | 1.1 | 2.8 | 4.8 | 3.4 |
| (w/w %) | 15.0 | 5.5 | 14.1 | 24.0 | 17.3 |
| Energy (Kcal) | 95 | 86 | 94 | 104 | 96 |
| Protein composition | | | | | |
| Casein | 5.6 | 6.9 | 4.9 | 5.0 | 4.9 |
| Casein Na | — | 1.1 | 1.1 | 3.3 | 3.1 |
| Casein Ca | — | 2.2 | 1.7 | — | — |
| Whole fat milk powder | 3.7 | — | 1.5 | 5.6 | 3.5 |
| Nonfat milk powder | 1.5 | 1.5 | 0.9 | 1.5 | 1.8 |
| Gelatin | 0.6 | 0.9 | 0.6 | — | 0.4 |
| Enzymatically hydrolyzed gelatin | 1.1 | 1.1 | — | — | — |
| Wheat flour | 5.6 | 4.0 | 2.0 | — | 1.0 |
| Cheese | 3.2 | — | 3.8 | 3.2 | 3.6 |
| Carbohydrate composition | | | | | |
| Purified sucrose | 1.7 | 3.3 | 5.7 | 0.5 | 3.5 |
| Fat composition | | | | | |
| Rice oil | 0.8 | 0.9 | 1.0 | 1.0 | 1.2 |
| Chocolate | — | — | — | 3.0 | — |
| Other components | | | | | |
| Vitamins | q.s | q.s | q.s | q.s | q.s |
| Minerals | q.s | q.s | q.s | q.s | q.s |
| Perfume | q.s | q.s | q.s | q.s | q.s |
| Viscosity (30° C.) cp | 1880 | 2310 | 1250 | 1220 | 760 |
| Amino acid score | 92 | 100 | 100 | 100 | 100 |

| Example No. | Example 11 | Example 12 | Example 13 |
|---|---|---|---|
| Protein | | | |
| (g/80 ml) | 9.8 | 11.2 | 9.4 |
| (w/w %) | 51.0 | 52.1 | 49.5 |
| Carbohydrate | | | |
| (g/80 ml) | 6.3 | 7.1 | 6.3 |
| (w/w %) | 32.8 | 33.3 | 33.2 |
| Fat | | | |
| (g/80 ml) | 3.1 | 3.2 | 3.3 |
| (w/w %) | 16.1 | 14.9 | 17.4 |
| Energy (Kcal) | 92 | 102 | 93 |
| Protein composition | | | |
| Casein | 5.6 | 6.3 | 4.8 |
| Casein Na | — | — | 1.5 |
| Casein Ca | 2.9 | 3.0 | 1.8 |
| Whole fat milk powder | 4.3 | 2.5 | 3.2 |
| Nonfat milk powder | — | 3.8 | 2.5 |
| Gelatin | 0.7 | 0.2 | — |
| Enzymatically hydrolyzed gelatin | — | 0.4 | — |
| Wheat flour | 1.4 | 0.8 | 1.0 |
| Cheese | 2.4 | — | 1.4 |
| Carbohydrate composition | | | |
| Purified sucrose | 3.5 | 1.7 | 1.5 |
| Fat composition | | | |
| Rice oil | 1.1 | 1.1 | 0.9 |
| Chocolate | — | 3.3 | 2.6 |
| Other components | | | |
| Vitamins | q.s | q.s | q.s |
| Minerals | q.s | q.s | q.s |
| Perfume | q.s | q.s | q.s |
| Viscosity (30° C.) cp | 900 | 2500 | 1000 |
| Amino acid score | 100 | 100 | 100 |

TEST EXAMPLE 1

According to the exercise loading test method of Tamaki et al. [Med. Sci. Sports Exerc., 24, 881 (1992)] as modified, the changes in fat mass and muscle mass due to variation in the duration of training and in the timing of feeding were investigated. The test protocol was as follows.

(1) Experimental animals

Fifty-two male SD rats, 4 weeks old, were divided into 3 groups of 10 individuals (exercise groups) and 2 control groups of 11 individuals (non-exercise groups).

(2) Animal Care

The animal breeding was conducted at a temperature of 23±1° C.

The lighting cycle of the animal room was 7:00–19:00. The animals were fed for 1 hour twice a day using AIN-93G (a standard rodent food for growing rats) according to a paired feeding schedule aligned with the mean intake value in the group of minimum intake among the five groups. Water was available ad libitum during the experiment period.

As the test food composition, a purified feed of the composition indicated below in Table 2 was used.

TABLE 2

| Material | Formulating amount (g) |
|---|---|
| Corn starch | 39.7486 |
| Casein | 20.0000 |
| Dextrinized corn starch | 13.2000 |
| Sucrose | 10.0000 |
| Soybean oil | 7.0000 |
| Cellulose powder | 5.0000 |
| Mineral mix | 3.5000 |
| Vitamin mix | 1.0000 |
| L-cysteine | 0.3000 |
| Choline bitartrate | 0.2500 |
| t-Butylhydroquinone | 0.0014 |
| Total | 100.0000 |

In the table, the casein is milk casein for general use and the cellulose powder is "Avicel PH102", a crystalline cellulose. The t-butylhydroquinone was added to the soybean oil.

The exercise groups were two groups taking the exercise before feeding in the morning (the exercise ended at 7:00) (Group 1 and Group 3) and one group taking the exercise before feeding in the evening (feeding began immediately after the exercise ended at 19:00) (Group 2). Group 1 received the ration at 7:00 and Group 3 received the ration at 11:00 or 4 hours after the exercise. Feeding in the evening was made at 19:00 for all the groups.

The control groups were one group receiving the morning ration at 7:00 (Group 4) and one group receiving the morning ration at 11:00 (Group 5).

Since rats are nocturnal animals, the feeding in the morning during 7:00–8:00 corresponds to the human supper which is taken before rest for the day and the feeding in the evening during 19:00–20:00 corresponds to the human breakfast.

(3) Exercise loading

The exercise loading was carried out as follows. By the resistance training method of Tamaki et al. [Med. Sci. Sports Exerc., 24, 881 (1992)] as modified, 10 animals in each group were simultaneously subjected to a training session.

(3-1) Set restriction time: An electroshock of 10 V and 0.3-second duration was given at 3-second intervals for a total of 15 times (about 50 seconds, 15×3 sec.).

(3-2) Number of liftings: The squat training (15 times at 2-minute intervals) was carried out in 10 sets (ca 30 min, 10×3 min) a day and this training was repeated 3 times a week (Sunday, Monday, and Wednesday for the group sacrificed on Thursday; Sunday, Tuesday, and Thursday for the group sacrificed on Friday) for 10 weeks.

(3-3) Load: The load was set at 65–70% of the maximum load.

(3-4) Training intensity schedule: weeks 0–2: 700 g×15 times, 10 sets; weeks 2–4: 900 g×15 times, 10 sets; weeks 4–6: 1200 g×15 times, 10 sets; weeks 6–8: 1400 g×15 times, 10 sets; and weeks 8–10: 1500 g×15 times, 10 sets.

(4) Evaluation parameters

On Thursday or Friday, the animals were sacrificed by decapitation 24 hours after the last exercise or after 12 hours of fasting and immediately necropsied within a time not more than 8 minutes for each animal. Analyses were made for skeletal muscle weight, body weight, liver weight, heart weight, and adipose tissue weight.

(5) Results

The results are shown in Tables 3–5.

Table 3 shows body weight, liver weight, and heart weight data.

Table 4 shows the weights (mg) of various skeletal muscles [soleus, gastrocnemius, plantaris, tibia, EDL, quadriceps, and triceps brachii].

Table 5 shows the weights (mg) of white fat tissues [epididymal, perirenal, mesenteric] and inter-scapular brown tissue.

TABLE 3

|  | Body weight (g) | Liver weight (g) | Heart weight (g) |
| --- | --- | --- | --- |
| Group 1 | 484 ± 5 | 11.6 ± 0.3*,** | 1.20 ± 0.02 |
| Group 2 | 484 ± 7 | 12.8 ± 0.4 | 1.14 ± 0.03 |
| Group 3 | 477 ± 8 | 13.6 ± 0.3# | 1.19 ± 0.03 |
| Group 4 | 470 ± 8 | 12.4 ± 0.4 | 1.14 ± 0.04 |
| Group 5 | 471 ± 8 | 13.2 ± 0.3 | 1.11 ± 0.04 |

TABLE 4

|  | Soleus (mg) | Gastrocnemius (mg) | Tibia (mg) |
| --- | --- | --- | --- |
| Group 1 | 409 ± 11** | 5181 ± 84*,** | 1893 ± 46*,** |
| Group 2 | 395 ± 14# | 5174 ± 108*,** | 1825 ± 57** |
| Group 3 | 384 ± 12 | 5207 ± 74*,** | 1826 ± 43** |
| Group 4 | 388 ± 15 | 4846 ± 117 | 1724 ± 44** |
| Group 5 | 353 ± 15 | 4713 ± 128 | 1549 ± 62 |

|  | Plantaris (mg) | EDL (mg) | Quadriceps (mg) | Triceps brachii (mg) |
| --- | --- | --- | --- | --- |
| Group 1 | 976 ± 19 | 488 ± 17 | 5941 ± 244$ | 3327 ± 85# |
| Group 2 | 947 ± 25 | 519 ± 53# | 6441 ± 190$ | 3305 ± 83# |
| Group 3 | 948 ± 16 | 455 ± 12 | 5188 ± 311 | 3237 ± 99 |
| Group 4 | 912 ± 21 | 452 ± 11 | 5429 ± 225 | 3258 ± 46 |
| Group 5 | 918 ± 31 | 422 ± 16 | 5331 ± 225 | 3045 ± 91 |

TABLE 5

|  | Epididymal (mg) | Perirenal (mg) |
| --- | --- | --- |
| Group 1 | 7623 ± 425* | 9198 ± 717** |
| Group 2 | 9629 ± 541 | 12196 ± 623 |
| Group 3 | 9648 ± 774 | 12181 ± 954 |
| Group 4 | 8924 ± 660 | 12530 ± 661 |
| Group 5 | 9085 ± 545 | 13149 ± 714 |

|  | Mesenteric (mg) | Interscapular (mg) |
| --- | --- | --- |
| Group 1 | 4268 ± 339*,§ | 278 ± 24# |
| Group 2 | 5682 ± 343 | 312 ± 20 |
| Group 3 | 5837 ± 558 | 331 ± 21 |
| Group 4 | 6246 ± 346 | 316 ± 16 |
| Group 5 | 6829 ± 457 | 345 ± 22 |

In the above tables, each value is the mean ± SE. In Table 3, the asterisk indicates $p<0.05$ versus Group 2, the double-asterisk indicates $p<0.01$ versus Group 3 and Group 5, and the parallel crosses indicate $p<0.05$ versus Group 4.

In Table 4, the asterisk indicates $p<0.05$ versus Group 4, the double-asterisk indicates $p<0.01$ versus Group 5, the parallel crosses indicate $p<0.05$ versus Group 5, the § mark indicates $p<0.01$ versus Goup 3, the $ mark indicates $p<0.01$ versus Group 3, Group 4 and Group 5.

In Table 5, the asterisk indicates $p<0.05$ versus Group 2 and Group 3, the double-asterisk indicates $p<0.01$ versus Group 2, Group 3, Group 4, and Group 5, the parallel crosses indicate $p<0.05$ versus Group 5, and the § mark indicates $p<0.01$ versus Group 4 and Group 5.

The following can be understood from the above tables.

Thus, the adipose tissue mass in Group 1 (the invention group) in which the training preceded the resting period was significantly smaller than the value in Group 2 in which the training preceded the active period, suggesting that the body fat percentage can be decreased successfully. Moreover, in Group 1 which was fed before the resting period and immediately after the training session, the adipose tissue mass wastsmaller even compared with Group 3 which was fed some time after training, indicating that a more effective decrease in body fat percentage can be realized according to the invention.

Test Example 2

Using the chronically cannulated dog model, the changes in the amino acid uptake of skeletal muscles and the skeletal muscle protein synthesis and decomposition rates due to variation in the timing of administration of an amino acid-glucose mix solution after exercise were investigated using the arterio-venous phenylalanine differential and the body protein metabolism determination with the stable isotope L-[$^2$H$_5$]phenylalanine. The test protocol was as follows.

(1) Experimental animals

Ten male 15-month-old beagle dogs were used.

(2) Construction of the animal model

Under general anesthesia with nembutal, chronic cannulas for blood sampling were indwelled in the aorta and external iliac vein. In addition, chronic cannulas were also indwelled in the external jugular vein and portal vein. Moreover, a cuff for blood flow measurement was sleeved over the external iliac vein. The animals were submitted to the experiment at the end of a 2-week-long convalescence period following operation.

(3) Test Composition (test solution) and Administration Method

As the test solution, a multiple amino acid preparation of the composition indicated below in Table 6 (Amiparen, manufactured by Otsuka Pharmaceutical Factory, 10%) and 10% Glucose Injection (manufactured by Otsuka Pharmaceutical Factory) were mixed in a 1:1 ratio and used.

Administration of the preparation was carried out by continuous drip infusion into the portal vein via the indwelling cannula at a rate of 10 ml/kg/hr.

TABLE 6

| Component | In 200 ml | In 300 ml | In 400 ml |
|---|---|---|---|
| L-leucine | 2.80 g | 4.20 g | 5.60 g |
| L-isoleucine | 1.60 g | 2.40 g | 3.20 g |
| L-valine | 1.60 g | 2.40 g | 3.20 g |
| L-lysine acetate | 2.96 g | 4.44 g | 5.92 g |
| (as L-lysine) | (2.10 g) | (3.15 g) | (4.20 g) |
| L-threonine | 1.14 g | 1.71 g | 2.28 g |
| L-tryptophan | 0.40 g | 0.60 g | 0.80 g |
| L-methionine | 0.78 g | 1.17 g | 1.56 g |
| L-phenylalanine | 1.40 g | 2.10 g | 2.80 g |
| L-cysteine | 0.20 g | 0.30 g | 0.40 g |
| L-tyrosine | 0.10 g | 0.15 g | 0.20 g |
| L-arginine | 2.10 g | 3.15 g | 4.20 g |
| L-histidine | 1.00 g | 1.50 g | 2.00 g |
| L-alanine | 1.60 g | 2.40 g | 3.20 g |
| L-proline | 1.00 g | 1.50 g | 2.00 g |
| L-serine | 0.60 g | 0.90 g | 1.20 g |
| Aminoacetic acid | 1.18 g | 1.77 g | 2.36 g |
| L-aspartic acid | 0.20 g | 0.30 g | 0.40 g |
| L-glutamic acid | 0.20 g | 0.30 g | 0.40 g |
| Total free amino acid content | 20.00 g | 30.00 g | 40.00 g |
| Essential amino acid content (E) | 11.82 g | 17.73 g | 23.64 g |
| Nonessential amino acid content (N) | 8.18 g | 12.27 g | 16.36 g |
| E/N | 1.44 | 1.44 | 1.44 |
| % Branched amino acid | 30.0 w/w % | 30.0 w/w % | 30.0 w/w % |
| Nitrogen content | 3.14 g | 4.71 g | 6.28 g |
| Na$^+$ content | ca 0.4 mEq | ca 0.6 mEq | ca 0.8 mEq |
| Cl$^-$ content | not contained | not contained | not contained |
| Acetate$^-$ content | ca 24 mEq | ca 36 mEq | ca 48 mEq |

(4) Test Protocol

The test protocol is shown in FIG. 1.

At the beginning of the experiment, a priming dose, 4.4 μmol/kg, of L-[$^2$H$_5$]phenylalanine (designated on the drawing as L-[ring-$^2$H$_5$]Phenylalanine) was administered from the external jugular vein. Thereafter, the same compound was administered by continuous drip infusion at a rate of 6.6 μmol/kg/h (constant) until completion of the experiment.

Blood sampling from the femoral artery and external iliac vein was carried out at the points of time indicated by the arrowmark in FIG. 1.

(5) Exercise Loading

A treadmill running load (speed: 10 km/h., slope 12%) was applied for 150 minutes.

(6) Test Conditions

The experiment was performed using the condition of feeding immediately after exercise and the condition of feeding 2 hours after exercise in a randomized crossover design with a recovery period of 2 weeks between conditions.

The condition of feeding immediately after exercise consisted in 2-hour continuous drip infusion of the test composition beginning immediately after exercise and the condition of feeding 2 hours after exercise consisted in 2-hour continuous drip infusion of the test composition beginning 2 hours after exercise.

(7) Evaluation parameters

1. Plasma phenylalanine-stable isotope ratio: a gas chromatograph-mass spectrometer
2. Plasma amino acid: a high-speed amino acid analyzer (Hitachi, Ltd., Model L-8500)
3. Plasma glucose: Glu-DH method
4. Plasma FFA: enzymatic method
5. Plasma insulin: RIA
6. Plasma CPK: RIA
7. Blood flow: Doppler method
8. Hematocrit:
9. Phenylalanine uptake-release balance in hindlimb skeletal muscle:

Balance = (arterial blood concentration − venous blood concentration) × blood flow × (1 − hematocrit/100) × body weight 10. Protein synthesis and decomposition rates: Those rates were calculated in accordance with the method of Barrett et al. [Biochem. J., 245, 223–228 (1987)].

(8) Results

Figure 2:
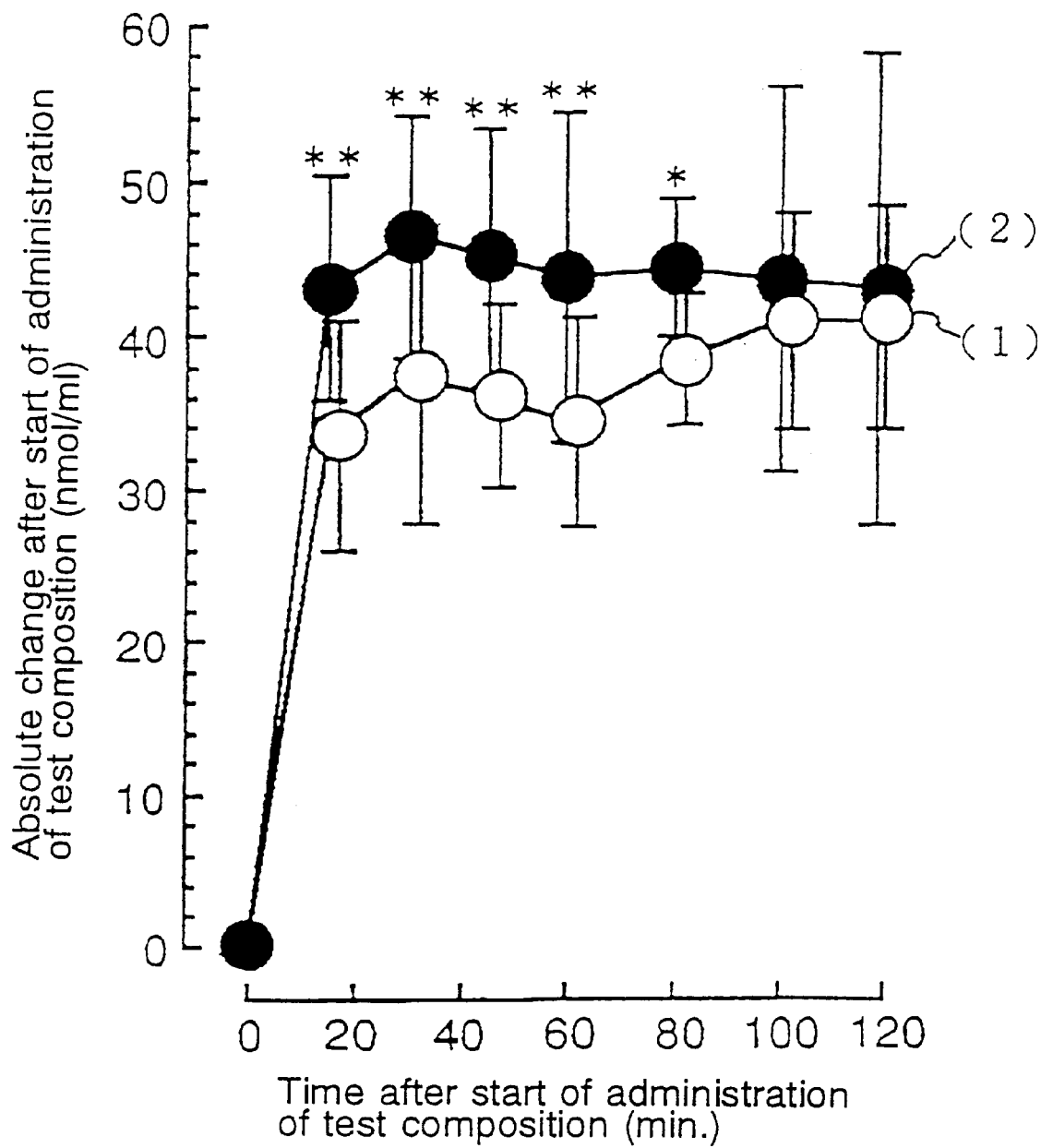
FIG. 2 is a graph showing the time course of arterial blood plasma phenylalanine concentration during administration of the test composition in an experiment according to Test Example 2.

The results are shown in FIG. 2 (the change in arterial blood plasma phenylalanine concentration during administration of the test composition), Table 7 (the hindlimb phenylalanine uptake rate during administration of the test composition) and Table 8 (protein synthesis and decomposition rates).

FIG. 2 is a graph constructed by plotting the time (minutes) after the start of administration of the test composition on the abscissa and the change (nmol/ml) in arterial blood plasma phenylalanine concentration after the start of administration of test composition on the ordinate. In FIG. 2, (1) represents the condition of feeding immediately after exercise (n=10) and (2) represents the condition of feeding 2 hours after exercise (n=10). Each value is the mean ± standard deviation (SD). The asterisk indicates p<0.05 with respect to the condition of feeding immediately after exercise and the double-asterisk indicates P<0.01 with respect to the condition of feeding immediately after exercise.

TABLE 7

| | 15–45 min. after administration nmol/kg/min. | 60–120 min. after administration nmol/kg/min. | 15–120 min. after administration nmol/kg/min. |
|---|---|---|---|
| Administration immediately after exercise | 4.44 ± 5.86 | 10.94 ± 6.59 | 8.15 ± 6 |
| Administration at 2 hrs. after exercise | 4.07 ± 6.07 | 5.36 ± 2.31* | 4.81 ± 2.81** |

The asterisk indicates p=0.049 with respect to the condition of feeding immediately after exercise and the double-asterisk indicates p=0.065 with respect to the same condition as above.

TABLE 8

| | | At rest nmol/kg/min. | During administration nmol/kg.min. |
|---|---|---|---|
| Administration immediately after excerise | Protein synthesis rate | 19.1 ± 8.8 | 29.7 ± 9.6 |
| | Protein decomposition rate | 27.3 ± 13.3 | 18.7 ± 5.7 |
| Administration at 2 hrs. after excercise | Protein synthesis rate | 16.4 ± 7.8 | 22.0 ± 10.1* |
| | Protein decomposition rate | 22.6 ± 11.0 | 16.5 ± 11.1 |

The asterisk indicates p=0.028 with respect to the rate of protein synthesis under the condition of feeding immediately after exercise.

Each value in the above respective tables is the mean ± standard deviation (SD) for n=10 and all statistical analyses were made by paired t-test.

The following can be understood from the above diagrams and tables.

It is apparent from Table 7 that the phenylalanine uptake of the hindlimb skeletal muscle tended to be greater during the period from 15 to 120 minutes after feeding under the condition of feeding immediately after exercise than under the condition of feeding 2 hours after exercise (8.15±6 vs. 4.81±2.81 nmol/kg/min., p=0.065) and significantly greater during the period from 60 to 120 minutes after ingestion of the test composition (10.94±6.59 vs. 5.36±2.31 nmol/kg/min., p=0.049).

It can also be seen from Table 8 that the rate of protein synthesis during administration of the test composition was significantly higher under the condition of feeding immediately after exercise than under the condition of feeding 2 hours after exercise (29.7±9.6 vs. 22.0±10.1 nmol/kg/min., p=0.028).

The above findings suggest that taking protein immediately after exercise contributes more to body protein synthesis than taking protein at an interval after exercise.

TEST EXAMPLE 3

An experiment was performed to investigate the time course of blood amino acid concentration following intake of the composition of the invention [a composition prepared in the same manner as Example 1 and containing 10.0 g (48.3%) of protein, 7.7 g (37.2%) of carbohydrate, and 3.0 g (14.5%) of fat, 78 ml per bottle, viscosity 2300 cp (30° C.), amino acid score 100] immediately after exercise or at 2 hours after exercise. The test protocol was as follows.

(1) Subjects

Five healthy university students belonging to an athletic club were enrolled.

(2) Test Conditions

The test was performed using the condition of feeding immediately after exercise and the condition of feeding 2 hours after exercise in a crossover design.

(3) Method

Figure 3:
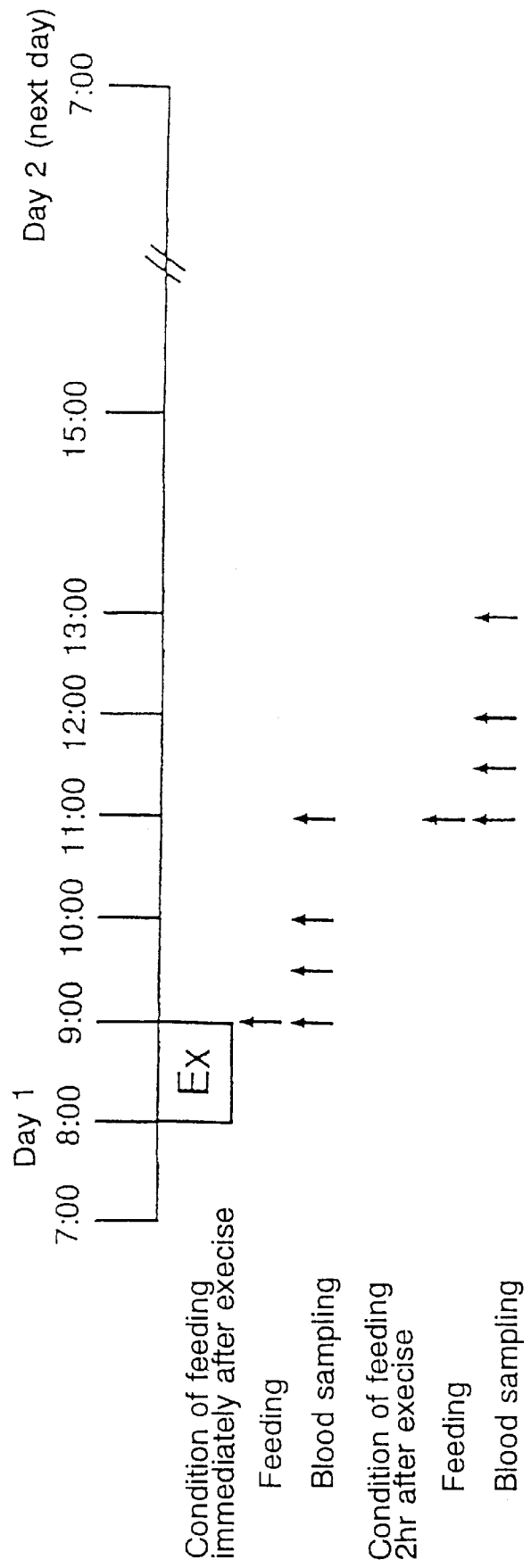
FIG. 3 shows the time schedule of an experiment according to Test Example 3.

The test schedule is shown in FIG. 3.

In the schedule, Ex beginning 8:00 on the test day stands for a bicycle ergometer exercise (60 min) loading equivalent to 60% $VO_{2max}$ (corresponding to 60% of the maximum oxygen uptake). The feeding and blood sampling time points are respectively indicated by the arrowmark.

Thus, under the condition of feeding immediately after exercise, one bottle equivalent of the composition of the invention was taken immediately after exercise, and under the condition of feeding 2 hours after exercise, one bottle equivalent of the composition of the invention was taken at an interval of 2 hours after exercise. Under both conditions, blood sampling was carried out immediately before and 30, 60, and 120 minutes after the intake.

The three meals (breakfast, lunch, and supper) on the day before the test and the three meals on the test day were respectively of the uniform menu among the subjects.

(4) Evaluation

The plasma phenylalanine concentration was determined with a high-speed amino acid analyzer (Hitachi, Ltd., Model L-8500) and the data were evaluated.

(5) Results

The results are shown in FIG. 4.

FIG. 4 is a graph constructed by plotting the time (min.) after intake of the test composition on the abscissa and the change (nmol/ml) in plasma phenylalanine concentration after intake on the ordinate. In the graph, (1) represents the condition of feeding immediately after exercise (n=5) and (2) represents the condition of feeding 2 hours after exercise (n=5). Each value is the mean ± SD and p represents the level of significance with respect to the condition of feeding immediately after exercise. Statistical analyses were made by the paired t-test.

The following conclusion can be drawn from FIG. 4.

Thus, the elevation of plasma phenylalanine concentration at 60 minutes after intake of the test composition was significantly smaller under the condition of feeding immediately after exercise than under the condition of feeding 2 hours after exercise and the degree of elevation tended to be smaller even at 120 minutes after intake. This result can be construed to suggest that a greater amount of phenylalanine was taken up in the tissue under the condition of feeding immediately after exercise than under the condition of feeding 2 hours after exercise and, therefore, that taking the composition of the invention immediately after exercise contributes more to body protein synthesis than feeding at an interval after exercise.

TEST EXAMPLE 4

The following test was performed to assess the feasibility of improving the chemical composition of the body by causing the composition of the invention to be taken immediately after a light resistance exercise in humans.

(1) Subjects

Fifteen female volunteers with a tendency toward obesity (mean body weight: 62.3±2.8 kg; mean age: 22.5±1.0 years) were enrolled.

(2) Weight Control Program

The volunteers were subjected to the following 12-week weight control program. Thus, each subject was instructed to make a light resistance exercise using a dumbbell for 30 minutes every day and take a standard diet for supper from Monday through Friday, excepting holidays, with the intake of refreshments and alcohol being prohibited. For breakfast, the menu of the food taken routinely was investigated and the subject was instructed to take breakfasts as close to the menu as possible. Lunches were not controlled and meals on Saturdays, Sundays, and holidays were to be taken ad libitum. The subject was instructed to make the exercise once a day, in the evening as a rule, with an interval of at least 1.5 hours between exercise and supper.

(3) Test Conditions

The subjects were divided into two groups, i.e. a group given the composition of the invention (Composition+Exercise in Test Example 3, n=7) and a group not given the composition (Exercise Only, n=8). The group given the composition of the invention was instructed to take the test composition described in Test Example 3 immediately after exercise.

(4) Evaluation Parameters
1. Body weight
2. Thickness of subcutaneous fat: Harpenden adipometer (manufactured by British Indicators)
3. Body fat percentage: calculated from subcutaneous fat thickness by means of the equation of Nagamine and the equation of Brozek The equation of Nagamine Male ≧18 years old: D=1.0913−0.00116×S Female ≧18 years old: D=1.0897−0.00133×S where D=body density, S=subcutaneous fat thickness (mm, sum of the dorsal brachial region and the infrascapular region)

The equation of Brozek et al.

F=4.570/D−4.142 where F=body fat percentage (%)

(5) Results

Figure 5:
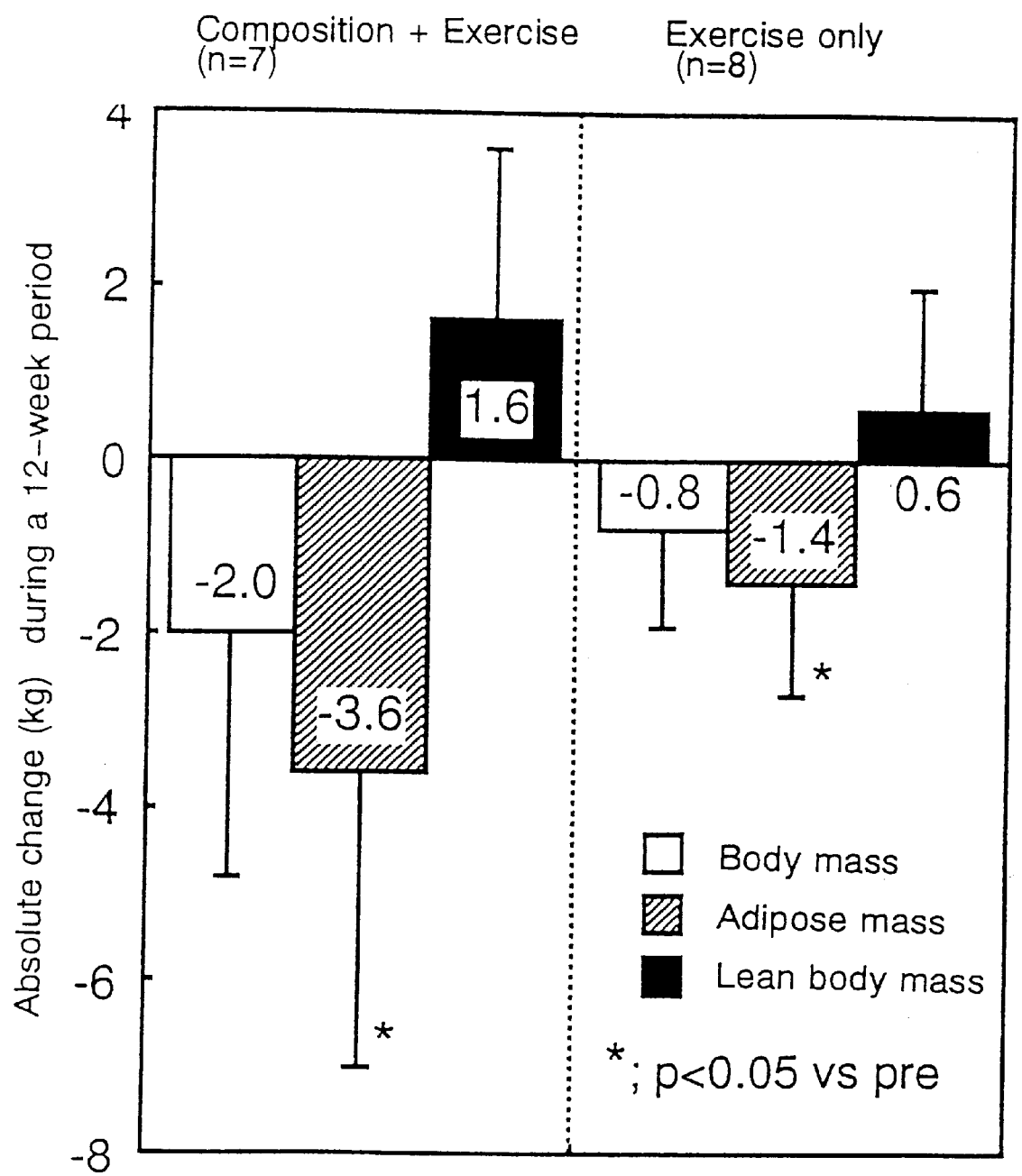
FIG. 5 is a graph showing the changes in body weight, fat mass, and lean body mass during a 12-week period in Test Example 4.

The results are shown in FIG. 5.

FIG. 5 is a diagrammatic representation of the changes in body weight, body fat weight ("adipose mass" in the diagram) and lean body weight ("lean body mass" in the diagram) during a 12-week period (with the respective values before initiation of the experiment being taken as baseline (0); the amounts of increase or decrease (kg) after 12 weeks are shown). The left side represents the group given the composition of the invention (Composition+Exercise) and the right side represents the non-fed group (Exercise Only). The asterisk indicates p<0.05 versus the baseline value before initiation of the experiment (Pre in the diagram).

Adipose mass was calculated as (body mass)×(body fat percentage), and lean body mass was calculated as (body mass)−(adipose mass).

The following conclusion could be drawn from the diagram.

Adipose mass was significantly decreased in both groups but whereas the mean decrease in the group given the composition of the invention was 3.6 kg, that in the non-fed group was 1.4 kg, indicating that the group given the composition of the invention tended to show a greater decrease in adipose mass.

Lean body mass tended to increase in both groups but whereas the increase in the group given the composition of the invention was 1.6 kg, the increase in the non-fed group was 0.6 kg. Here again, the group given the composition of the invention tended to show a relatively greater increase in lean body mass.

The above findings indicate that ingesting the composition of the invention immediately after exercise results in a greater body composition-ameliorating effect. Furthermore, the fact that there was no difference in energy and protein intakes among subjects shows that the above beneficial results could be attributed to ingestion timing.

TEST EXAMPLE 5

The following test was performed to investigate whether taking the composition of the invention immediately after a light resistance exercise contributes to increased energy metabolism in humans. The test protocol was as follows.

(1) Subjects

Fifteen male volunteers with a tendency toward obesity (mean body weight: 75.1±2.5 kg; mean age: 33.9±1.7 years) were enrolled.

(2) Weight control program

The volunteers were subjected to the following weight control program for 12 weeks. Thus, each subject was instructed to make a light resistance exercise using a dumbbell for 30 minutes every day and take a defined diet for supper from Monday through Friday, excepting holidays, with the intake of refreshments and alcohol being prohibited. For breakfast, the menu of the food taken routinely was investigated and the subject was instructed to take breakfasts as close to the menu as possible. Lunches were not controlled and meals on Saturdays, Sundays, and holidays were to be taken ad libitum. The subject was instructed to make the exercise once a day, in the evening as a rule, with an interval of at least 1.5 hours between exercise and supper.

(3) Test Conditions

The subjects were divided into two groups, i.e. a group given the composition of the invention (Composition+Exercise, n=8) and a group not given the composition (Exercise Only, n=7). The group given the composition of the invention was instructed to take the test composition described in Test Example 3 immediately after exercise.

(4) Dietary Loading Test

Figure 6:
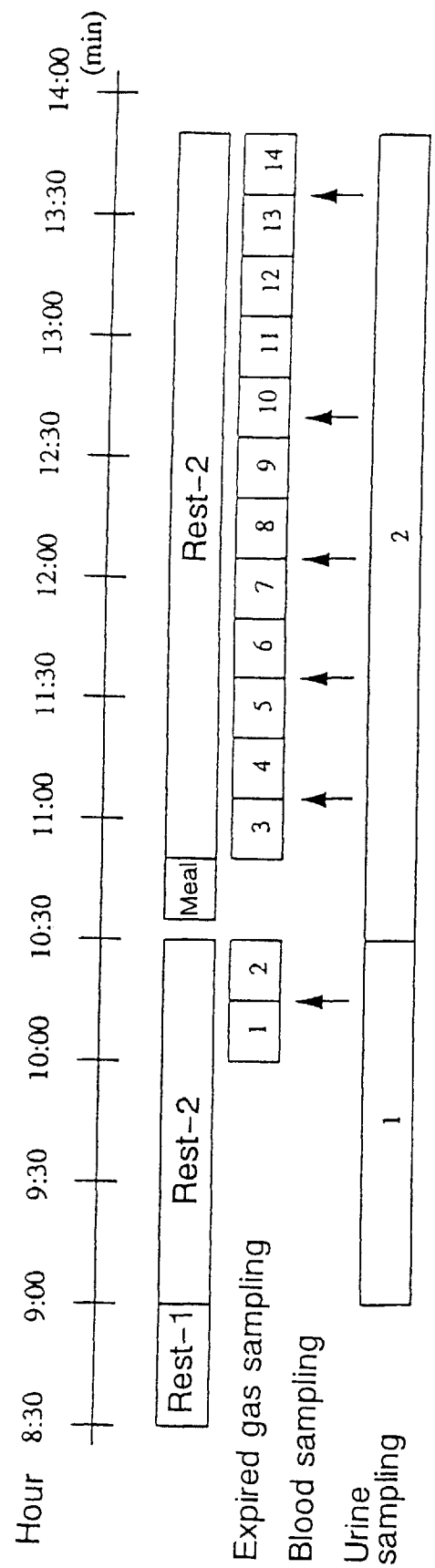
FIG. 6 shows the experimental schedule of a meal loading test according to Test Example 5.

A dietary loading test in which the diet shown below in Table 9 was given twice, i.e. before initiation of the experiment and at the end of the experiment, was carried out according to the test protocol shown in FIG. 6. Sampling of expired gas was performed during the resting period (Rest-2) and the resting period after intake of the diet (Rest-2) at the points of time indicated at 1–14 in FIG. 6. The oxygen uptake was determined and the resting and postprandial metabolic rates ($VO_2$(ml/kg(BW)/min) were calculated. The rate of metabolism was determined by the method described hereinafter under (5) 2.

TABLE 9

|  | Weight (g) | Carbo-hydrate (g) | Fat (g) | Protein (g) | Total (g) |
| --- | --- | --- | --- | --- | --- |
| Bread | 90.0 | 43.2 | 3.4 | 7.6 | 54.2 |
| Margarine | 5.0 | 0.0 | 4.1 | 0.0 | 4.1 |
| Boiled egg | 60.0 | 0.5 | 6.7 | 7.4 | 14.6 |
| Boneless ham | 40.0 | 1.1 | 1.0 | 6.3 | 8.4 |
| Orange juice | 300.0 | 31.5 | 0.3 | 1.5 | 33.3 |
| Apple | 50.0 | 6.6 | 0.1 | 0.1 | 6.8 |
| Yoghurt | 100.0 | 5.0 | 3.0 | 3.9 | 11.9 |
| Salt | 0.5 | 0.0 | 0.0 | 0.0 | 0.0 |
| Total (g) | — | 87.9 | 18.6 | 26.8 | 133.3 |
| Total energy (MJ) | — | 1.47 | 0.70 | 0.45 | 2.62 |
| % Energy | — | 56.1 | 26.7 | 17.2 | 100.0 |

(5) Evaluation Parameters
1. Oxygen uptake: Douglas bag method.
2. Resting rate of metabolism and postprandial rate of metabolism: Ferrannini's method (Metabolism, 37, 287–301, 1988).

(6) Results

Figure 7:
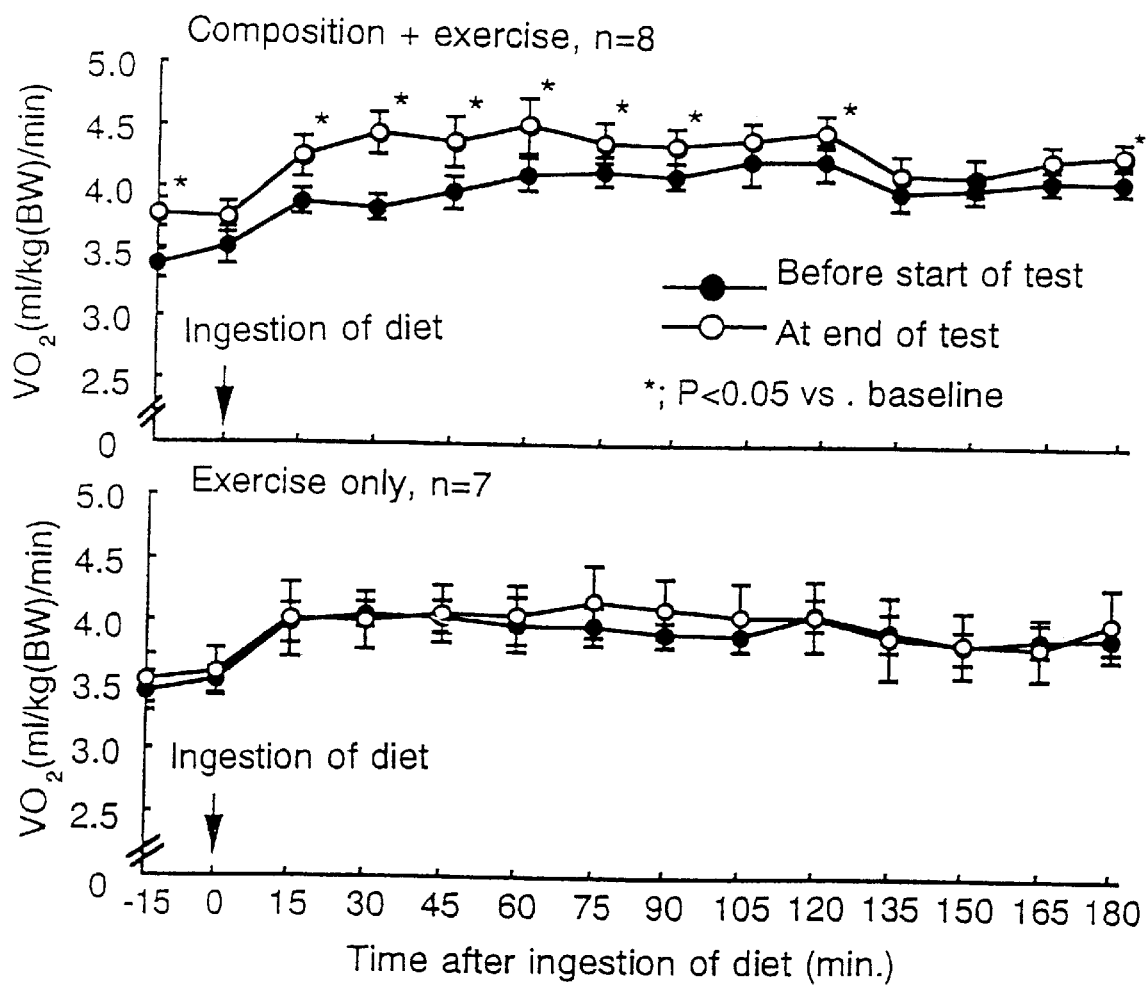
FIG. 7 is a graph constructed by plotting the oxygen intake from 15 minutes before ingestion of a specified diet in the dietary loading test performed before and after an experiment according to Test Example 5.

The results are shown in FIG. 7 and Table 10.

FIG. 7 is a graph constructed by plotting the oxygen uptake during the dietary loading test before start of the experiment and at the end of the experiment over a time beginning 15 minutes before ingestion of the standardized diet (indicated as −15) (ordinate: oxygen consumption $VO_2$ (ml/kg body weight/min.), abscissa: time (min.) after ingestion of the diet). The upper row represents the results in the group given the composition of the invention (Composition+exercise) and the lower row represents the results in the non-fed group (Exercise only). In the graph, time 0 corresponds to the ingestion time and is indicated by the arrowmark, the asterisk indicates p<0.05 versus the baseline value before start of the experiment.

Table 10 shows the changes in the resting metabolic rate (J/kg/min) and postprandial metabolic rate (J/kg/min) calculated from the oxygen uptake data in the group given the composition of the invention (Composition+exercise, n=8) and the non-fed group (Exercise only, n=7) before start of the experiment (baseline) and at the end of the experiment (wk12).

TABLE 10

| | Composition-fed group | | | Non-fed group | | |
|---|---|---|---|---|---|---|
| | Before initiation of test | At end of test | p = | Before initiation of test | At end of test | p = |
| Resting metabolic rate | 68.1 ± 2.2 | 73.6 ± 2.0 | 0.026 | 69.1 ± 2.2 | 69.9 ± 3.8 | N.S. |
| Postprandial metabolic rate | 81.4 ± 2.2 | 86.6 ± 2.8 | 0.012 | 79.6 ± 2.4 | 80.3 ± 4.9 | N.S. |

Each value (unit: J/kg body weight/min) is the mean ± standard error and N.S. means no significant difference.

It can be inferred from the above graph.

As shown in FIG. 7, the test group given the composition of the invention (upper row) showed significant increases in oxygen intake under dietary loading at the end of the experiment (−15, 15, 30, 45, 60, 75, 90, and 135 min) but the non-fed group (lower row) showed no change.

Moreover, as shown in Table 10, the fed group showed significant increases in the resting and post-prandial rates of metabolism calculated from oxygen uptake data at the end of the experiment. In contrast, the non-fed group showed no change.

The above findings point to the possibility of stimulating energy consumption, that is to say the possibility of building a lean physical constitution, by causing the composition of the invention to be ingested immediately after exercise.

TEST EXAMPLE 6

Using chronically cannulated model dogs, an amino acid-glucose mixture was administered before and during exercise and the amino acid balance of skeletal muscles and viscera, urinary excretions of urea nitrogen, and changes in muscle glycogen concentration were investigated. The test protocol was as follows.

(1) Experimental animals

Male 11-month-old mongrel dogs (mean body weight: 17.0±0.6 kg) were used.

(2) Construction of the animal model

Under general anesthesia with Nembutal, chronic catheters for blood sampling were indwelled in the artery, femoral vein, hepatic vein, and portal vein, and a chronic catheter for administration of the test material was indwelled in the external jugular vein. In addition, probes for blow flow measurement were attached to the external iliac artery, hepatic artery, and portal vein. During a 2-week postoperative convalescence period, recovery was confirmed from WBC, hematocrit, appetite, and body weight change before animals were used in the experiment.

(3) Experimental Conditions

The experiment was performed in four groups, namely AG group [amino acid+glucose feeding condition (a 50:50 mixture of Amiparen 10% (Otsuka Pharmaceutical Factory) and 10% Glucose Injection (Otsuka Pharmaceutical Factory))], AA group [amino acid feeding condition (a 50:50 mixture of Amiparen 10% (Otsuka Pharmaceutical Factory) and physiological saline (Otsuka Pharmaceutical Factory))], G group [glucose feeding condition (10% Glucose Injection (Otsuka Pharmaceutical Factory)), and S group [saline feeding condition (Physiological Saline (Otsuka Pharmaceutical Factory) alone)] in a randomized crossover design with a 2-week washout (recovery) period between conditions.

(4) Experimental Procedures

Figure 8:
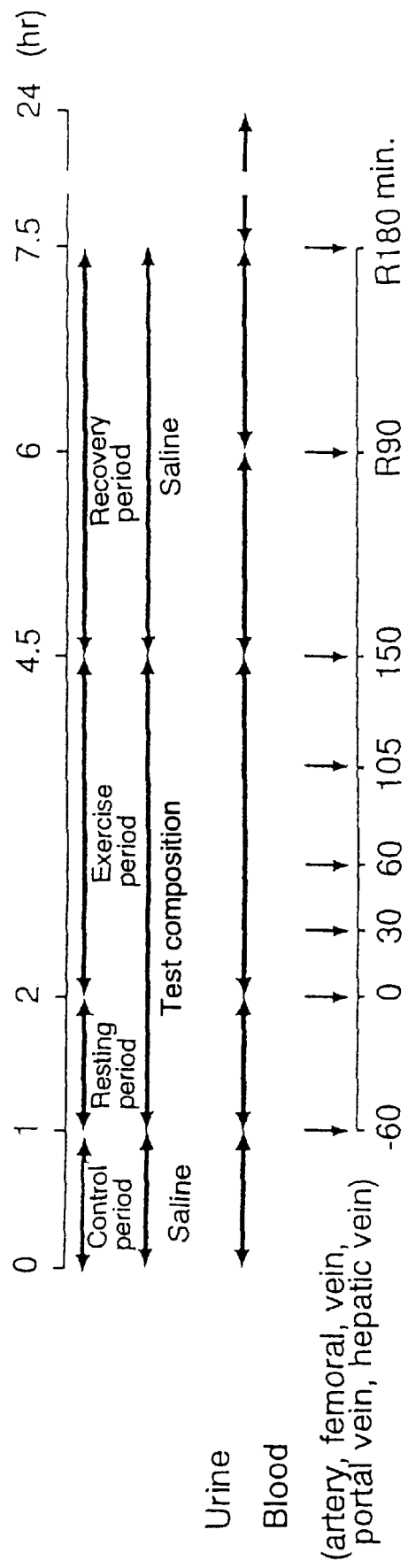
FIG. 8 shows the schedule of an experiment according to Test Example 6.

The experimental schedule is shown in FIG. 8. Experiment 1: After the 1-hour resting period, the test material was infused from the external jugular vein at a rate of 10 ml/kg/hr over 3.5 hours. Sixty minutes after start of administration, the animals were loaded with a 2.5-hour treadmill exercise. Completion of the exercise coincided with completion of administration of the test composition. To provide for a recovery period, the animal was held in a dog sling for 3 hours. During the resting period and the recovery period, physiological saline was administered for securing the necessary urine volume. After the 3-hour recovery period, the animal was brought back to the metabolic cage and put on feed.

Blood sampling and urine sampling were performed at the points of time indicated in FIG. 8.

(5) Exercise Loading

The animals were loaded with a treadmill running exercise (speed 10 km/hr, slope 12%) for 150 minutes.

(6) Evaluation Parameters
1. Plasma amino acid: a high-performance amino acid analyzer (Hitachi L-8500)
2. Plasma glucose: Glu-DH method
3. Plasma FFA: enzymatic method
4. Plasma insulin: RIA method
5. Urea nitrogen: UV method
6. Plasma CPK: UV method
7. Plasma LDH: UV method
8. Blood lactate: enzymatic method (Diagluca, Toyobo)
9. Blood flow: Doppler method
10. Hematocrit
11. Glycogen assay: the method of Lo et al. (J. Appl. Physiol, 28, 234–236, 1970)
12. Skeletal muscle Phe uptake-release balance Balance =

(arterial blood concentration − femoral venous blood concentration) × external iliac vein blood flow × (1 − hematocrit/100)/body weight

13. Intestinal tract essential amino acid uptake-release balance

Balance = (arterial blood concentration − portal blood concentration) × portal blood flow × (1 − hematocrit/100)/body weight (7) Statistical Analyses

Intergroup comparison at each point of time and group-to-group comparison of time courses were made by Fisher PLSD. All calculations were carried out using the statistical computation software Stat-View. The results were invariably shown in mean ± SD. The level of significance was 5%.

(8) Results

The results are shown in FIGS. 9–14.

Figure 9:
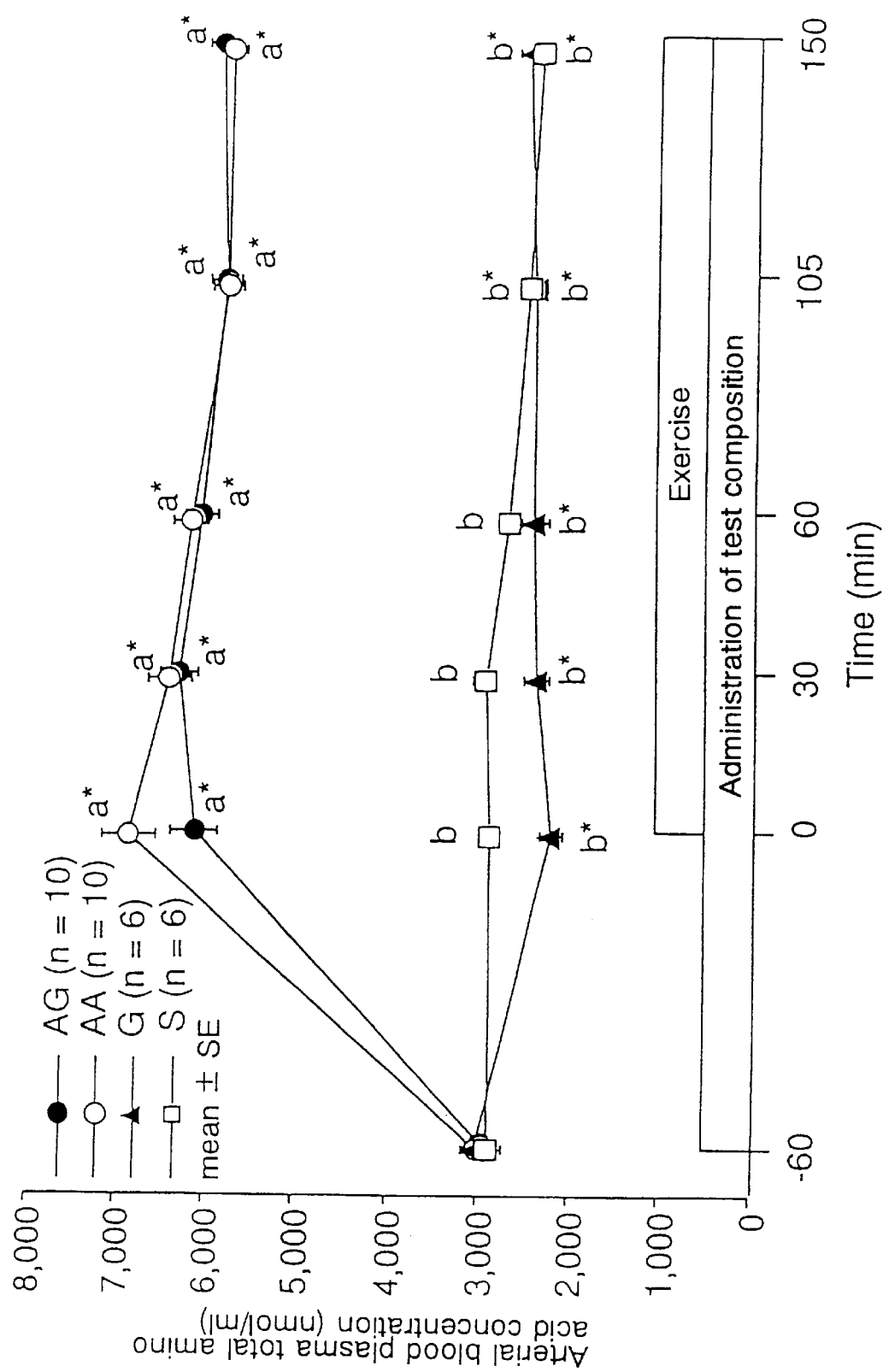
FIG. 9 is a graph showing the time course of arterial blood plasma total amino acid concentration in an experiment according to Test Example 6.

FIG. 9 shows the time course of arterial blood plasma total amino acid concentration [ordinate: arterial blood plasma total amino concentration (nmol/ml), abscissa: time after start of administration of test composition at −60 min (Time, min)].

Figure 10:
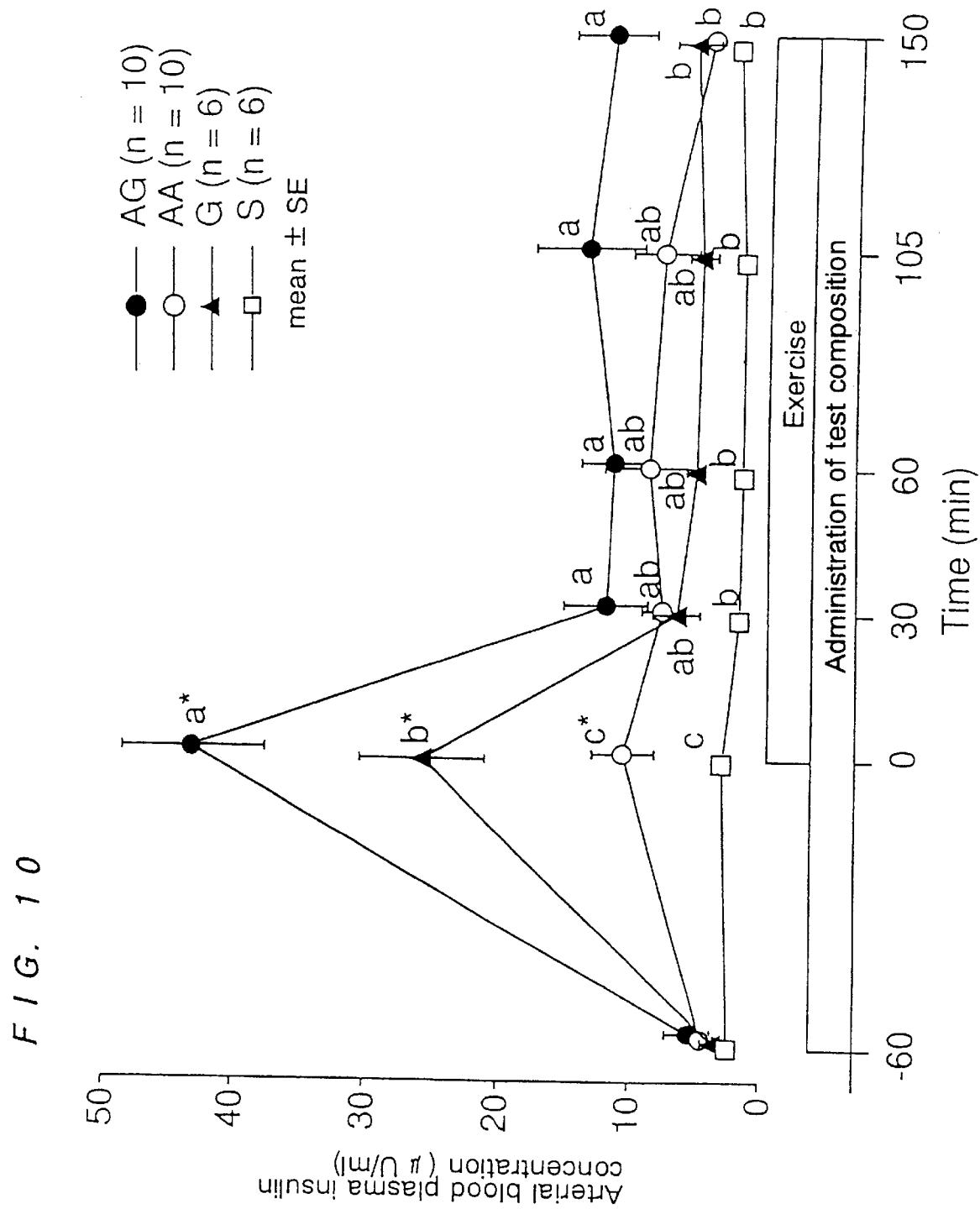
FIG. 10 is a graph showing the time course of arterial blood plasma insulin concentration in a test according to Test Example 6.

FIG. 10 shows the time course of insulin concentration [ordinate: arterial blood plasma insulin concentration ($\mu$U/ml), abscissa: time after start of administration of test composition at −60 min (Time, min)].

Figure 11:
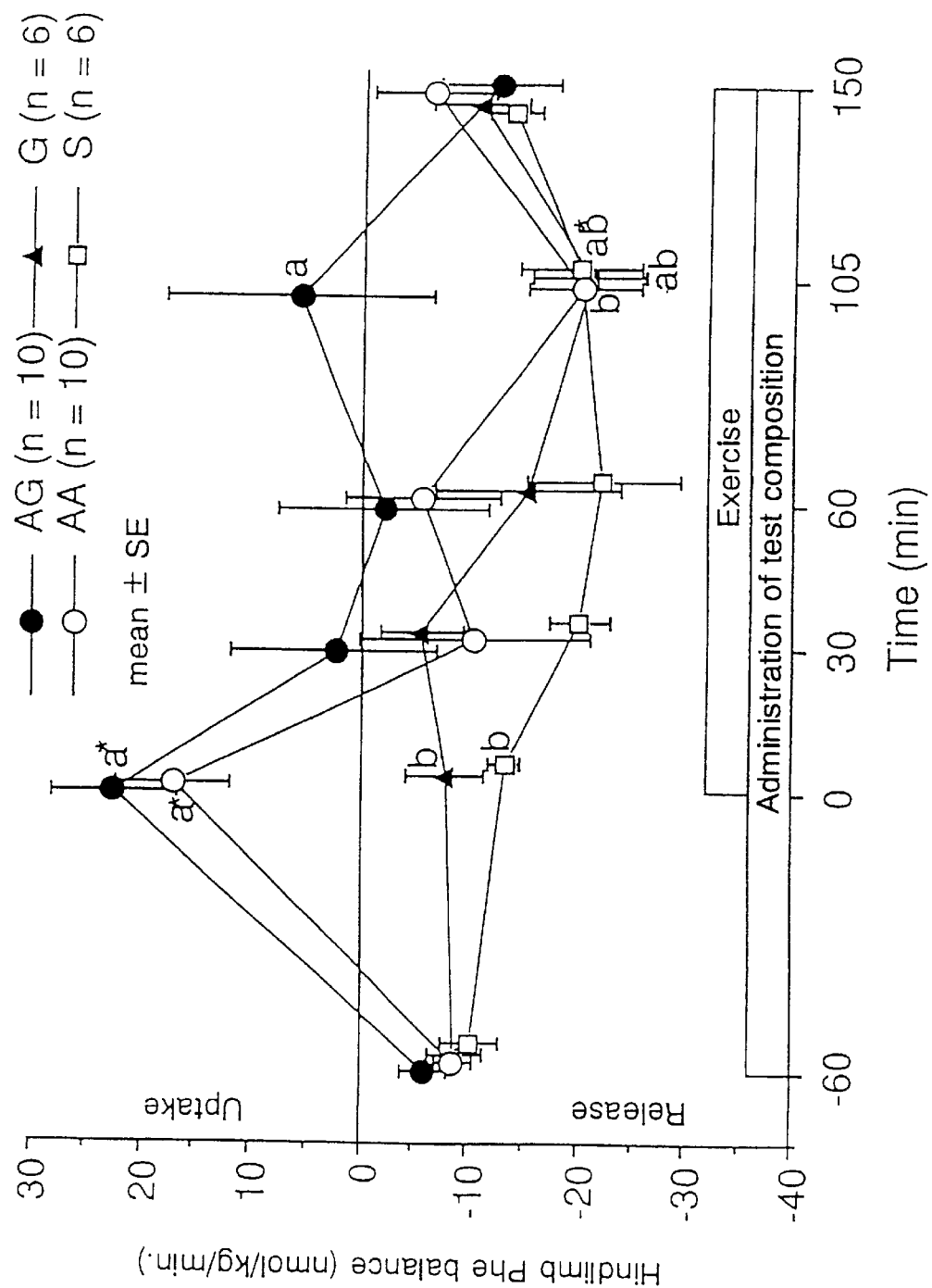
FIG. 11 is a graph showing the phenylalanine (Phe) balance of the hind leg in an experiment according to Test Example 6.

FIG. 11 is a graph showing the hindlimb phenylalanine (Phe) balance [ordinate: hindlimb Phe balance (nmol/kg/min), abscissa: time after start of administration of test composition at −60 min (Time, min)].

Figure 12:
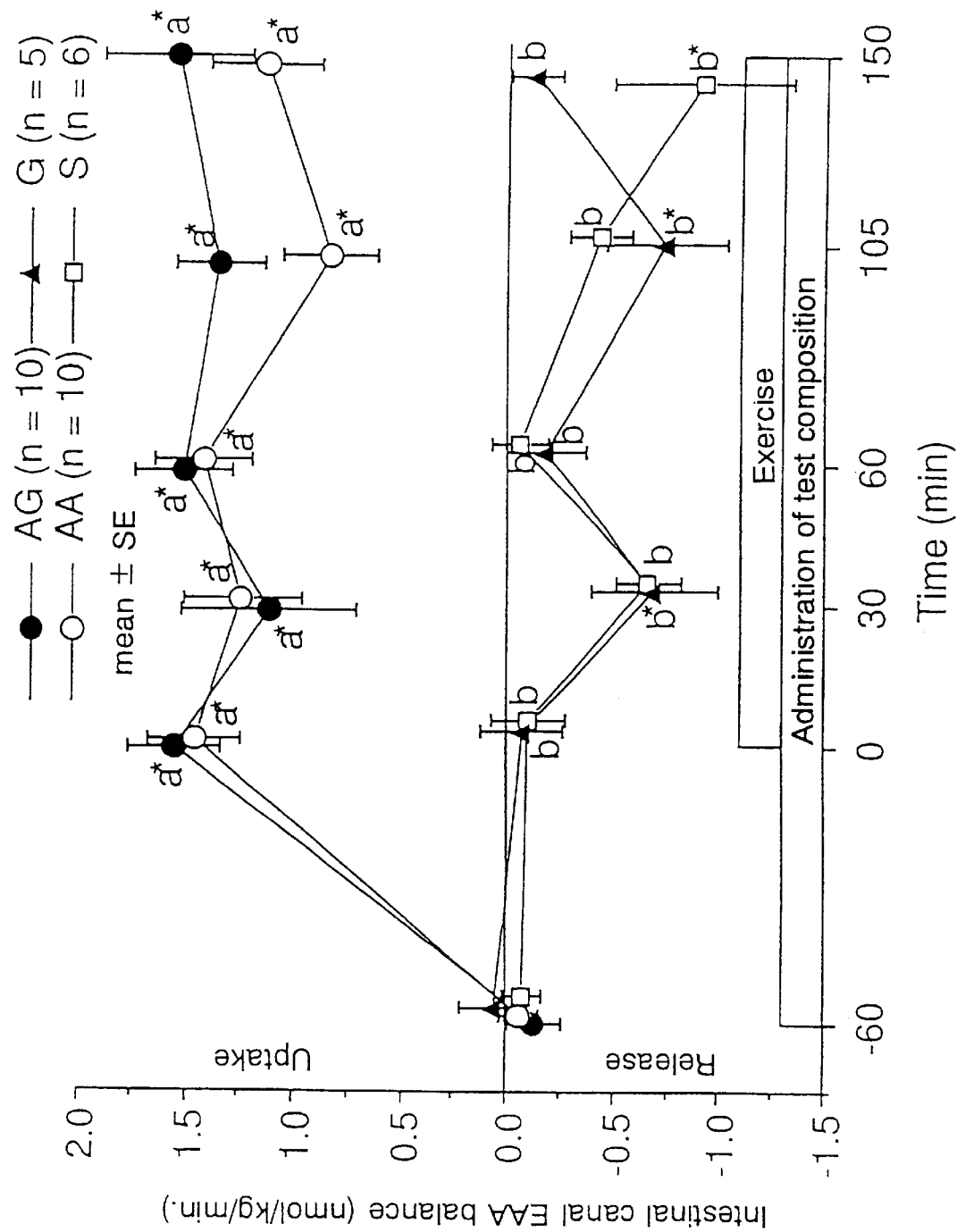
FIG. 12 is a graph showing the essential amino acid (EAA) balance in the intestinal tract in an experiment according to Test Example 6.

FIG. 12 is a diagrammatic representation of the intestinal tract essential amino acid (EAA) balance (ordinate: intestinal tract EAA balance (nmol/kg/min), abscissa: time after start of administration of test composition at −60 min (Time, min)].

Figure 13:
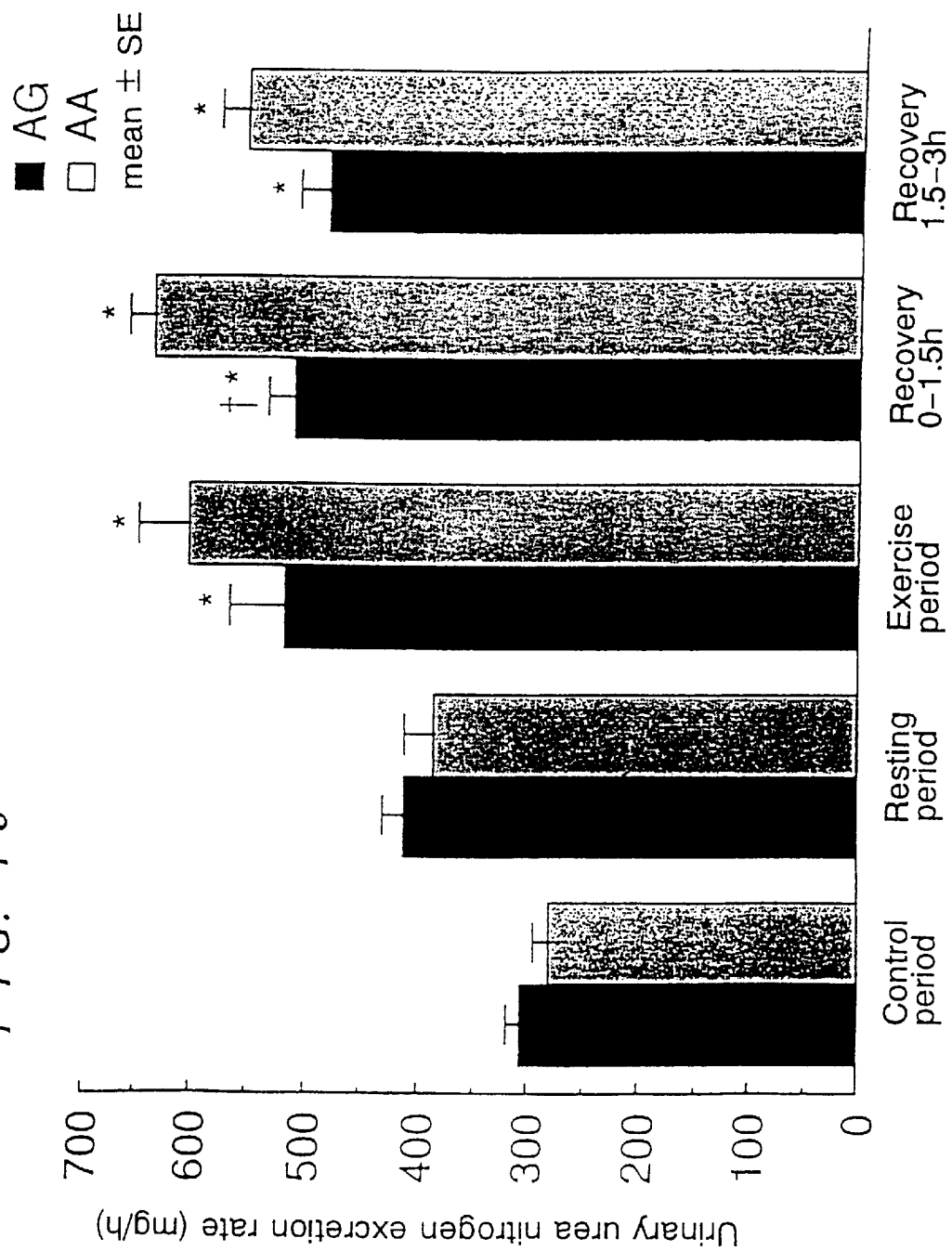
FIG. 13 is a graph showing the time course of urinary excretion of urea nitrogen in an experiment according to Test Example 6.

FIG. 13 is a diagrammatic representation of changes in urinary urea nitrogen excretion [ordinate: urinary urea nitrogen excretion rate (mg/h), abscissa: the points of time during the control period, resting period, exercise period, and recovery period as indicated in the experimental schedule of FIG. 8].

Figure 14:
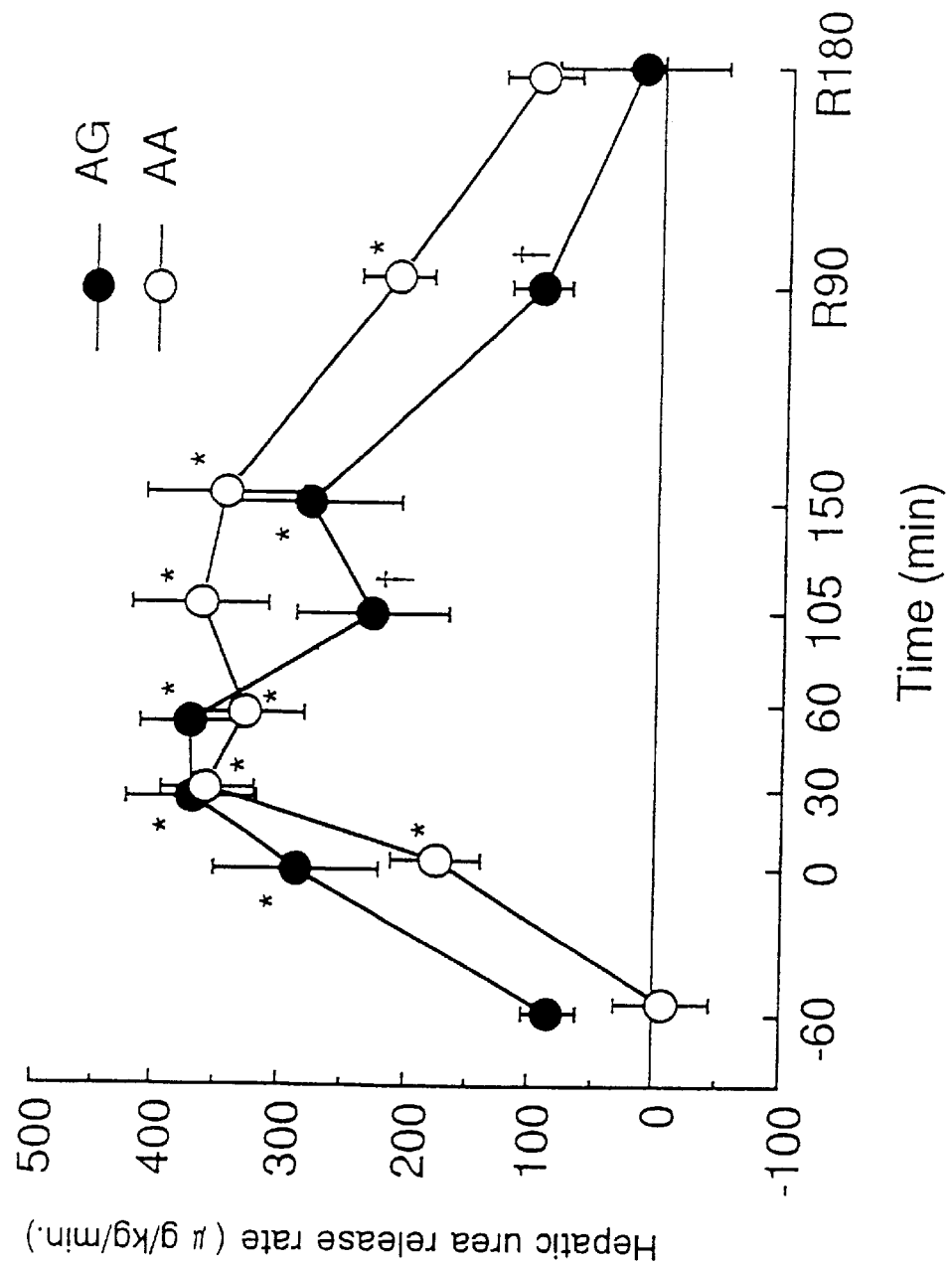
FIG. 14 is a graph showing the urea nitrogen balance of the liver in an experiment according to Test Example 6.

FIG. 14 is a diagrammatic representation of the hepatic urea nitrogen balance [ordinate: urea nitrogen release rate ($\mu$g/kg/min), abscissa: time after start of administration of test composition at −60 min (Time, min)].

The values plotted in FIGS. 9–14 are invariably mean ± SE and the alphabet letters (a, b) indicate that there is a significant difference at p<0.05 between the respective groups. The asterisk indicates p<0.05 vs. pre-administration baseline. The values plotted in FIGS. 13 and 14 are mean ± SE, the asterisk indicates a significant difference at p<0.05 vs. pre-administration baseline; and the dagger indicates p<0.05 between groups.

The following can be inferred from the above diagrams.

a) As shown in FIG. 9, administration of AG and AA, both containing amino acids, respectively resulted in significantly high plasma total amino acid concentrations before and after exercise. Moreover, as shown in FIG. 10, administration of AG and G respectively resulted in the elevation of insulin concentration. With AG, the increase in insulin concentration was greatest despite the glucose dose was only one-half as compared with G.

The above results suggest that the blood amino acid concentration can be well upheld by amino acid feeding and that the concurrent administration of amino acids and carbohydrate causes a greater stimulation of insulin secretion than the administration of carbohydrate alone.

b) As shown in FIG. 11, administration of AG and AA, both containing amino acids, before exercise respectively resulted in a switchover of hindlimb Phe balance from the release phase to the uptake phase. However, during exercise, the Phe balance declined and, in the case of AA, shifted to the release phase. In the case of AG, the balance remained in the neighborhood of ±0.

The above results suggest that administration of amino acids before exercise suppresses decomposition of muscle protein and that concomitant administration of carbohydrate helped inhibit the decomposition of muscle protein even during exercise.

Furthermore, the observed inhibition of the decomposition of muscle protein during exercise with AG alone suggests a mechanism involving the insulin secretion stimulating action of AG.

c) As shown in FIG. 12, administration of AG and AA, both containing amino acids, respectively resulted in an increased intestinal tract uptake of EAA before and during exercise.

This result suggests the likelihood that the proteolysis in the intestinal tract before and during exercise can be suppressed by the amino acid feeding prior to exercise.

d) As shown in FIG. 13, the urinary urea nitrogen secretions from the start of feeding to the hour 3 of recovery were significantly smaller for AG than for AA. Moreover, as shown in FIG. 14, the hepatic release of urea was more greatly inhibited for AG than for AA.

The above results suggest that concurrent administration of amino acids and carbohydrate resulted in suppression of the deamination of amino acids, that is to say suppression of utilization of amino acids for other uses (mainly utilization as energy sources) other than body protein synthesis.

As data supportive of the urinary urea nitrogen secretion data, there can be mentioned the data indicating that compared with amino acids only, amino acids+carbohydrate caused a smaller urinary secretion of urea nitrogen (cf. Test Example 7 presented hereinafter, FIG. 16) even when administered immediately after exercise.

TEST EXAMPLE 7

Using chronically cannulated model dogs, a mixture of amino acids and glucose was administered after exercise and the time course of urinary urea nitrogen excretion was compared with that following administration of amino acids only. The test protocol was as follows.

(1) Experimental animals

Ten male 15-month-old beagle dogs (mean body weight 11.8±0.3 kg) were used.

(2) Test conditions

The experiment was performed using two conditions, i.e. in AG group [amino acids+carbohydrate feeding condition (a 50:50 mixture of Amiparen 10% (Otsuka Pharmaceutical Factory) and 10% Glucose Injection (Otsuka Pharmaceutical Factory))] and AA group [amino acid feeding condition (a 50:50 mixture of Amiparen 10% (Otsuka Pharmaceutical Factory) and physiological saline (Otsuka Pharmaceutical Factory))], in a randomized crossover design with a 2-week washout period between conditions.

(3) Experimental Procedure

Figure 15:
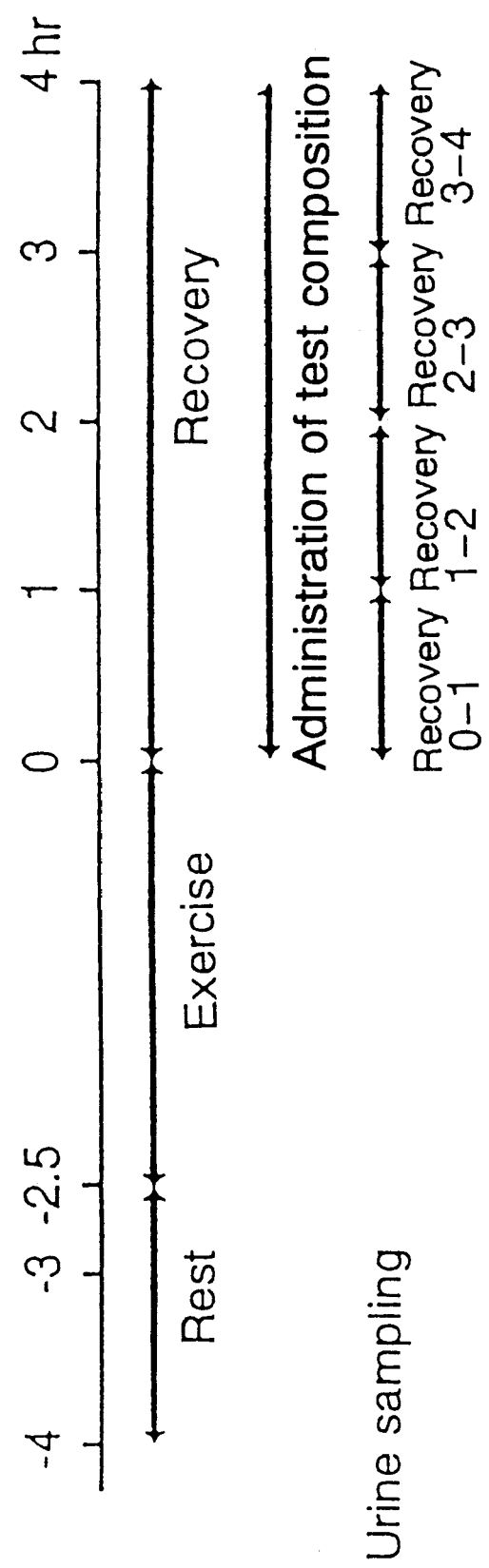
FIG. 15 shows the schedule of an experiment according to Test Example 7.

The test schedule is shown in FIG. 15.

After a 90-minute resting period, a treadmill exercise load was applied. Starting immediately after exercise, the test composition was continuously administered into the portal vein at a rate of 10 ml/kg/hr for 4 hours. Also starting immediately after exercise, the whole urine was collected during the administration period (Hour 0–1 designated as Recovery 0–1, hour 1–2 as Recovery 1–2, hour 2–3 as Recovery 2–3, and hour 3–4 as Recovery 3–4).

(5) Exercise Loading

A treadmill running load (speed 10 km/hr, slope 12%) was applied for 150 minutes.

(6) Evaluation Parameter 1. Urinary urea nitrogen: UV method (7) Statistical Analyses Intergroup comparisons were made by paired t-test. The statistical computation software Stat-View was used for all calculations. All the results were expressed in mean± SD. The level of significance was 5%.

(8) Results

Figure 16:
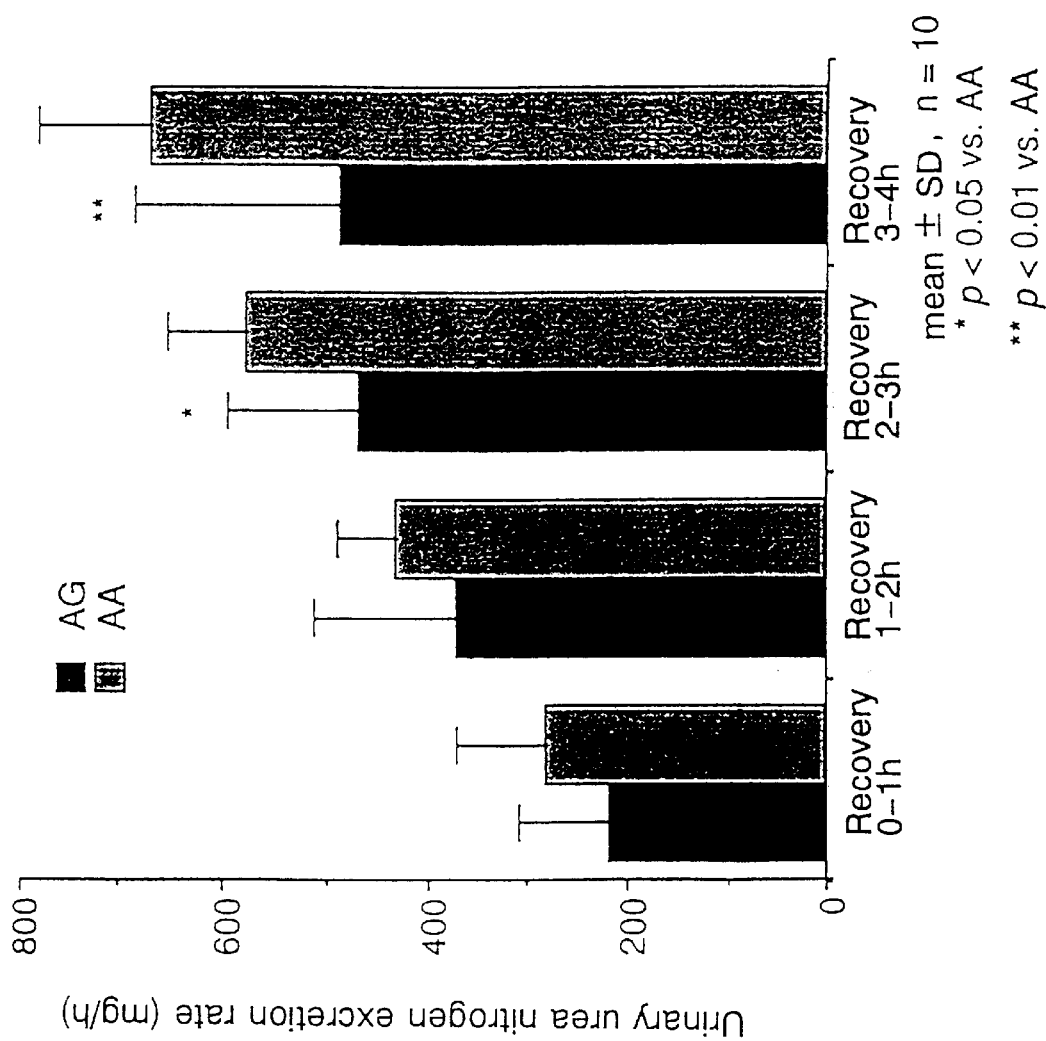
FIG. 16 is a graph showing the release of urea nitrogen in the urine in an experiment according to Test Example 7.

The results are shown in FIG. 16.

FIG. 16 is a diagrammatic representation of the urinary urea nitrogen excretion rate (mg/h) per unit hour starting immediately after exercise.

The following is evident from the above graph.

a) As shown in FIG. 16, the urinary urea nitrogen excretion rates during Recovery-2–3 and Recovery 3–4 periods were significantly lower when amino acids and carbohydrate had been concurrently administered as compared with administration of amino acids only.

The above results suggest that the concurrent administration of amino acids and carbohydrate suppressed the deamination reaction of amino acids, that is to say prevented utilization of amino acids for purposes other than body protein synthesis.

TEST EXAMPLE 8

The time course of blood amino acid concentration and that of blood insulin concentration following ingestion of the composition of the invention before exercise were analyzed in comparison with those after ingestion of a commercial protein powder (protein alone) and ingestion of a commercial carbohydrate food (carbohydrate alone). The test protocol was as follows.

(1) Subjects

Five male students belonging to a university athletic club were enrolled.

(2) Test Conditions

The test was performed using the condition of feeding with the same composition of the invention as described in Test Example 3 (P-13), the condition of feeding with a commercial protein powder of the same protein content (PP), and the condition of feeding with a commercial carbohydrate food of the same caloric value but with a carbohydrate content about 3 times as large as the composition of the invention (CHO) in a crossover design.

The commercial protein powder mentioned above was SAVAS Protein XX available from Meiji Seika Kaisha, Ltd. and the commercial carbohydrate food was Wider Energy-In available from Morinaga Seika K.K. 3

(3) Experimental Procedure

Standardized regimens were used for three meals (breakfast, lunch, and supper) on the day before experiment and two meals (lunch and supper) on the day of experiment.

On the day of experiment, the test food was given at 8:30 and starting 30 minutes after feeding, i.e. 9:00, a treadmill running load corresponding to 60% $VO_{2max}$ was applied for 60 minutes.

Blood sampling was performed before ingestion, 30 minutes after ingestion (immediately before start of exercise), immediately after completion of exercise (90 minutes after ingestion), 30 minutes after completion of exercise (120 minutes after ingestion), 60 minutes after completion of exercise (150 minutes after ingestion), and 120 minutes after completion of exercise (210 minutes after ingestion).

(4) Evaluation Parameters

1. Plasma amino acid: a high-performance amino acid analyzer
2. Serum insulin: RIA (5) Results The results are shown in FIGS. 17–19.

Figure 17:
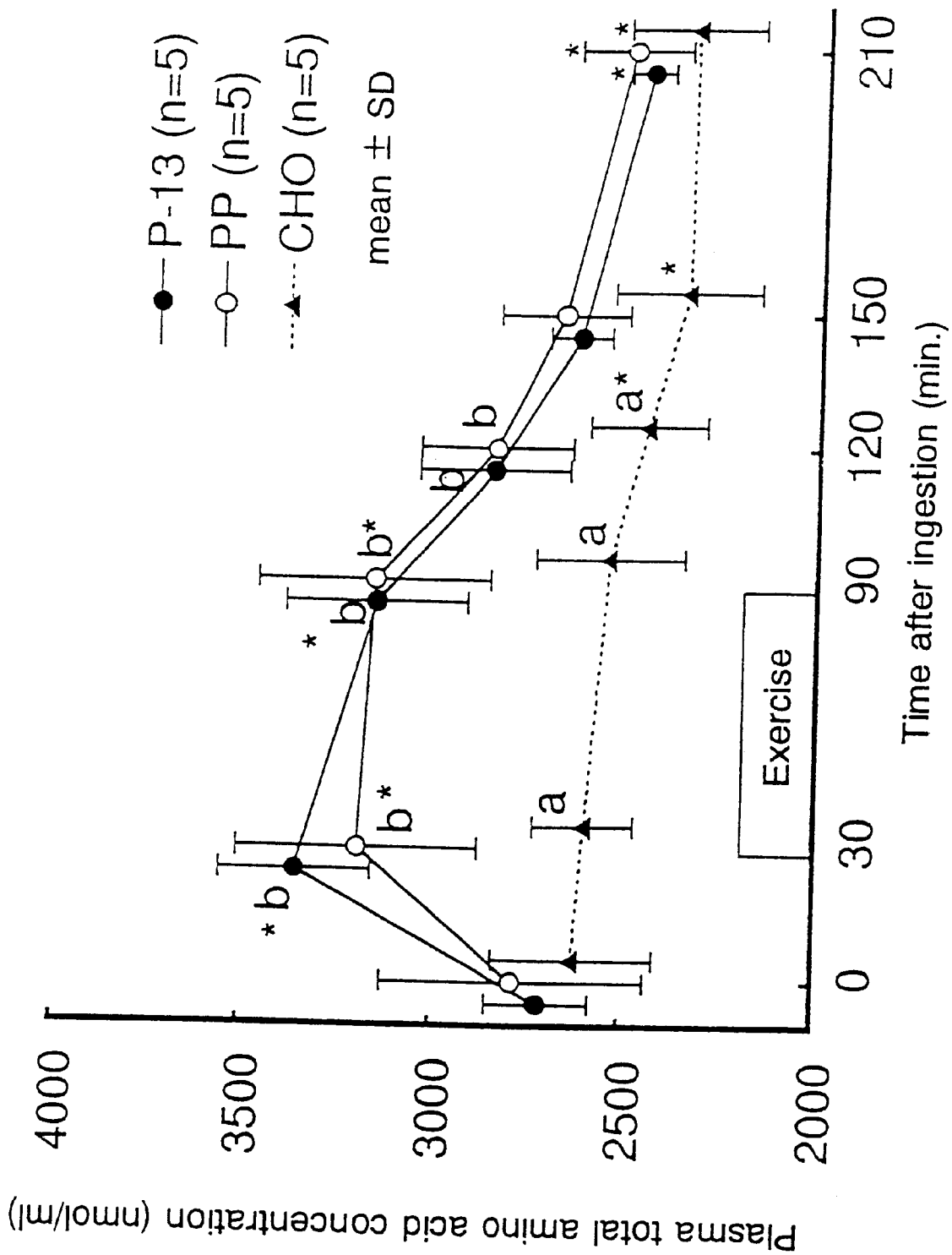
FIG. 17 is a graph showing the time courses of plasma total amino acid concentration after intake of test foods in an experiment according to Test Example 8.

FIG. 17 shows the time course of plasma total amino acid concentration after ingestion of the test food. In the diagram, plasma total amino acid concentration (nmol/ml) is plotted on the ordinate and the time after ingestion (min) is plotted on the abscissa. The 30–90 min period corresponds to the treadmill exercise (Exercise in the diagram).

Figure 18:
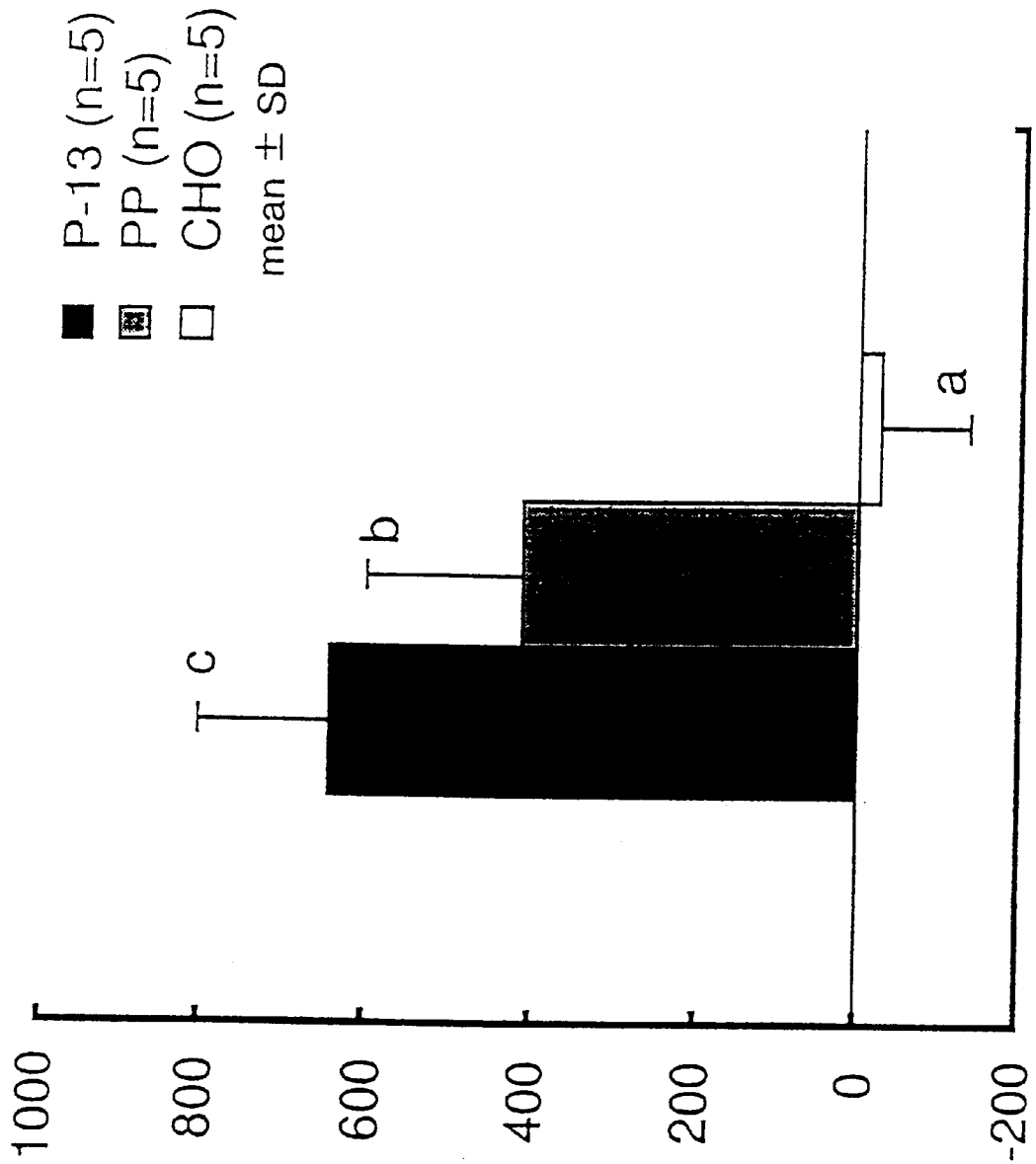
FIG. 18 is a graph showing the time course of plasma total amino acid concentration following intake of the test food up to 30 minutes in an experiment according to Test Example 8.

FIG. 18 shows the changes (nmol/ml) in plasma total amino acid concentration during 30 minutes after ingestion of the test food in the P-13, PP, and CHO groups.

Figure 19:
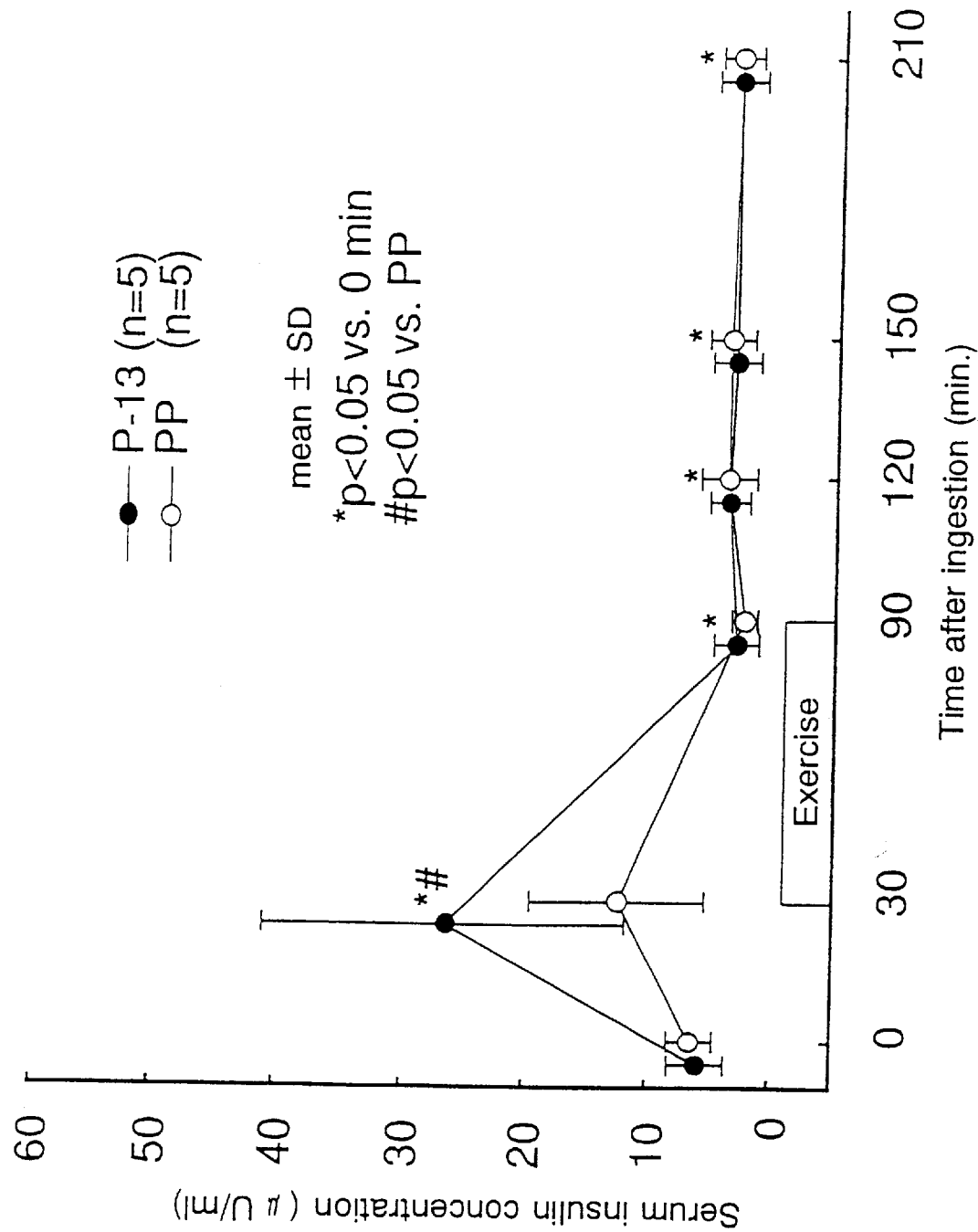
FIG. 19 is a graph showing the time course of serum insulin concentration after intake of the test food in an experiment according to Test Example 8.

FIG. 19 shows the changes ($\mu$U/ml) in serum insulin concentration after ingestion of the test food.

In the diagrams, each value represents the mean ± SD. In FIG. 17, the asterisk indicates $p<0.05$ vs. 0 min. The alphabet letters a, b, and c in FIGS. 17 and 18 indicate $p<0.05$ between the respective groups. In FIG. 19, the asterisk indicates $p<0.05$ vs. 0 min and the parallel crosses indicates $p<0.05$ vs. PP. Statistical analyses were made by paired t-test.

The following can be inferred from the above diagrams.

a) It is clear from FIG. 17 that in the group given the composition of the invention (P-13 group) and the group given the commercial protein powder (PP group), the plasma total amino acid concentration was significally elevated in 30 minutes after ingestion and remained in a plateau throughout the exercise period. Moreover, in those groups, the total amino acid concentration was significantly higher than the concentration in the group given the commercial carbohydrate food (CHO group) even up to 30 minutes after completion of exercise. In addition, the absolute increase of plasma total amino acid concentration up to 30 minutes after ingestion in the group given the composition of the invention was significantly greater than the concentration in the group given the commercial protein powder (FIG. 18).

The above results suggest the possibility of upholding the blood amino acid level during exercise at a high level and suppressing the decomposition of body protein during exercise by ingesting the composition of the invention before the start of exercise. The results also suggest that the composition of the invention is superior to the commercial protein powder in digestibility and absorption.

b) As shown in FIG. 19, the serum insulin concentration at 30 minutes after feeding was elevated in the group given the composition-of the invention (P-13 group) but was not elevated in the group given the commercial protein powder (PP group) and this serum insulin level at 30 minutes was significantly high in favor of the group given the composition of the invention.

The above results suggest that owing to the formulation of carbohydrate, the composition of the invention has an insulin secretion stimulating action. Since insulin promotes tissue amino acid uptake and body protein synthesis and suppresses decomposition of body protein, the insulin secretion stimulating action of the composition of the invention is considered to be beneficial for body protein synthesis.

TEST EXAMPLE 9

In this test, the composition of the invention as described in Test Example 3 was fed immediately after exercise and the time courses of blood amino acid and insulin concentrations were compared with those found after feeding with a carbohydrate-free commercial protein powder. The test protocol was as follows.

(1) Subjects

Twelve healthy male university students belonging to an athletic club were enrolled.

(2) Test conditions

The condition (P-13) of taking one bottle (78 ml) of the composition of the invention and the condition of taking a carbohydrate-free commercial protein powder of the same protein content (PP) were used in a crossover design.

As the commercial protein powder, SAVAS Protein XX available from Meiji Seika Kaisha, Ltd. was used.

(3) Method

The three meals (breakfast, lunch, and supper) on the day before and the three meals on the test day were the uniform rations.

Starting 16:00 on the test day, a bicycle ergo-meter exercise load equivalent to 70% $VO_{2max}$ was applied for 50 minutes, after which the task of lifting a 25 kg barbell 10 times was assigned. After completion of this exercise, the subject was instructed to take the test food. Blood sampling was performed before intake of the test food (immediately after exercise), 30 minutes after intake, 60 minutes after intake, and 120 minutes after intake.

(4) Evaluation Parameters

1. Plasma amino acid: a high-performance amino acid analyzer
2. Serum insulin: by RIA (5) Results The results are presented in FIGS. 20 and 21.

Figure 20:
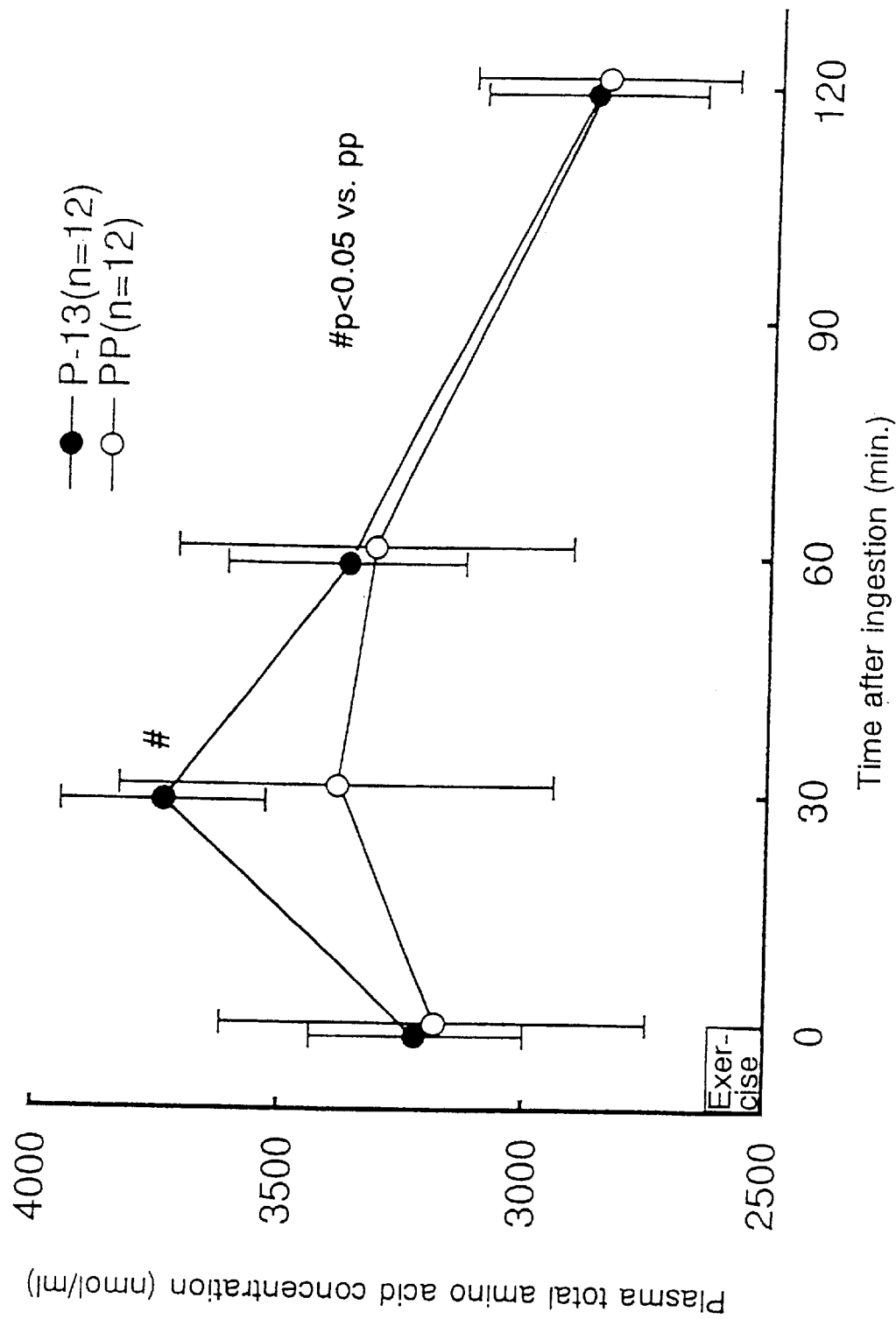
FIG. 20 is a graph showing the time course of plasma total amino acid concentration after intake of the test food in an experiment according to Test Example 9.

FIG. 20 is a diagrammatic representation of the time course of plasma total amino acid concentration after ingestion of the test food [ordinate: plasma total amino acid concentration (nmol/ml), abscissa: time (min) after ingestion].

Figure 21:
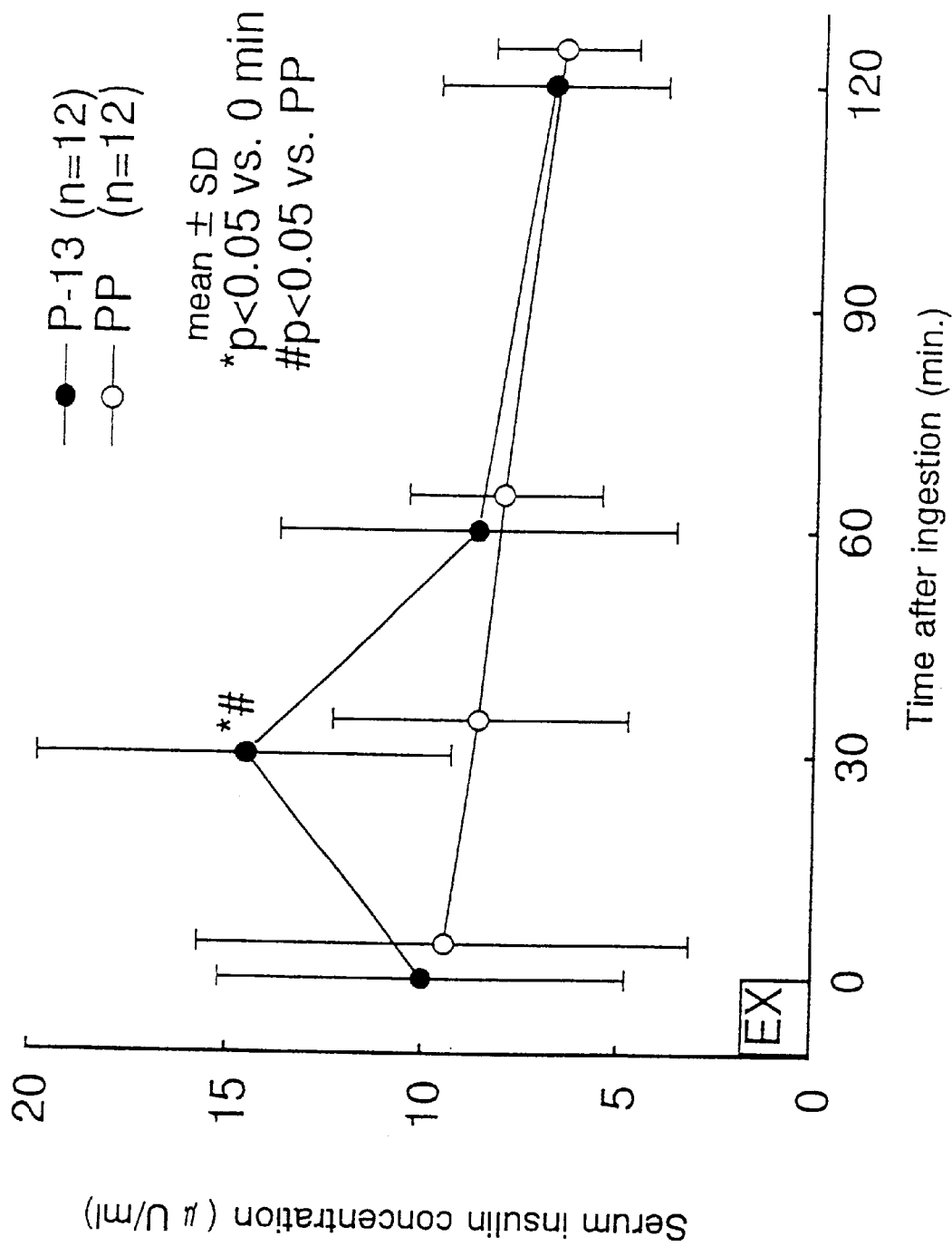
FIG. 21 is a graph showing the time course of serum insulin concentration after intake of the test food in an experiment according to Test Example 9.

FIG. 21 is a diagrammatic representation of the time course of serum insulin concentration after ingestion of the test food (ordinate: serum insulin concentration ($\mu$U/ml), abscissa: time (min) after ingestion).

Each plot in the respective graphs is the mean ± SD and the asterisk and parallel crosses in FIG. 21 indicate a significant difference at p<0.05 from the level at 0 min. and a significant difference at p<0.05 from the commercial protein powder group (PP), respectively. Statistical analyses were made by paired t-test.

The following is clear from those diagrams.

a) As can be seen in FIG. 20, the plasma total amino acid concentration at 30 minutes after intake of the test food was significantly higher in the group given the composition of the invention (P-13 group) as compared with the group given the commercial protein powder (PP group). This finding suggests that the composition of the invention is superior to the protein powder in digestability and absorption.

b) It can be seen from FIG. 21 that whereas the serum insulin concentration at 30 minutes after ingestion was elevated in the group given the composition of the invention, it was not elevated in the group given the commercial protein powder so that the serum insulin level at 30 minutes after ingestion in the former group was significantly higher.

The above findings suggest that the carbohydrate included in the composition of the invention stimulated insulin secretion. Since insulin promotes tissue amino acid uptake and body protein synthesis and suppresses decomposition of body protein, the insulin secretion-stimulating action of the composition of the invention is favorable for body protein synthesis.

What is claimed is:

1. A method for improving the body, wherein said improving of the body is reduced adipose mass and increased mass, comprising ingesting before, during or after physical exercise, a nutritionally effective amount of a food supplement comprising 10–65 weight % of protein, 5–25 weight % of fat, 15–70 weight % of carbohydrate, and 0.1–20 weight % of additive, and wherein said supplement is mixed with an emulsifier.

2. The method of claim 1, wherein the ingestion of said food supplement by said subject after physical exercise occurs immediately following to within one hour of exercise.

* * * * *